United States Patent
Sarat et al.

(10) Patent No.: US 9,083,676 B2
(45) Date of Patent: Jul. 14, 2015

(54) SYSTEMS AND METHODS FOR RELIABLY USING PING TO ACCOUNT FOR INTERACTIONS WITH ELECTRONIC CONTENT

(71) Applicant: Google Inc., Mountain View, CA (US)

(72) Inventors: Sandeep Sarat, Westford, MA (US); Mathieu Gagne, Somerville, MA (US); Michael Kleber, Newton, MA (US); Eric Shienbrood, Sudbury, MA (US)

(73) Assignee: Google Inc., Mountaiin View, CA (US)

( * ) Notice: Subject to any disclaimer, the term of this patent is extended or adjusted under 35 U.S.C. 154(b) by 210 days.

(21) Appl. No.: 13/942,289

(22) Filed: Jul. 15, 2013

(65) Prior Publication Data

US 2015/0019690 A1   Jan. 15, 2015

(51) Int. Cl.
*G06F 15/16* (2006.01)
*H04L 29/08* (2006.01)
*G06F 17/22* (2006.01)

(52) U.S. Cl.
CPC ............ *H04L 67/02* (2013.01); *G06F 17/2235* (2013.01)

(58) Field of Classification Search
USPC .................................. 709/203, 206, 219, 226
See application file for complete search history.

(56) References Cited

U.S. PATENT DOCUMENTS

| 7,363,384 | B2 | 4/2008 | Chatani et al. | |
| 8,169,945 | B2 | 5/2012 | Sheriff et al. | |
| 8,255,818 | B2* | 8/2012 | Bales et al. | 715/769 |
| 2006/0198321 | A1* | 9/2006 | Nadeau et al. | 370/254 |
| 2007/0088852 | A1* | 4/2007 | Levkovitz | 709/246 |
| 2007/0192439 | A1* | 8/2007 | Bhaskaran | 709/219 |
| 2008/0244038 | A1 | 10/2008 | Martinez | |
| 2009/0234968 | A1* | 9/2009 | Thomas et al. | 709/241 |
| 2010/0223114 | A1* | 9/2010 | Yao et al. | 705/14.12 |

FOREIGN PATENT DOCUMENTS

| EP | 2 138 967 | 12/2009 |
| JP | 2007-328106 | 12/2007 |
| KR | 10-0821929 | 4/2008 |
| KR | 10-2008-0101485 | 11/2008 |
| WO | WO-01/11516 | 2/2001 |

OTHER PUBLICATIONS

International Search Report & Written Opinion on PCT/US2014/031034 dated Aug. 27, 2014.
Living Standard Chapter 4.12 Links, May 5, 2013. http://www.whatwg.org/specs/web-apps/current-work/multipage/links.html.
Living Standard HTML Standard, May 5, 2013. http://www.whatwg.org/specs/web-apps/current-work/.

* cited by examiner

*Primary Examiner* — El Hadji Sall
(74) *Attorney, Agent, or Firm* — Foley and Lardner LLP; John D. Lanza

(57) ABSTRACT

A method for reliably using ping to account for interactions with electronic content includes receiving a request for a content item from a user device, selecting a content item in response to the request, determining whether the user device is ping enabled, and generating a hyperlink for inclusion with the selected content item. The hyperlink has a target URL and a ping attribute. At least one of the target URL and the ping attribute is based on a result of the determination whether the user device is ping enabled. The method further includes distributing the content item and the hyperlink to the user device and receiving a ping request from the user device. The ping request includes the target URL and an identifier of the distributed content item. The method further includes accounting for the interaction in response to receiving the ping request from the user device.

20 Claims, 5 Drawing Sheets

SYSTEMS AND METHODS FOR RELIABLY USING PING TO ACCOUNT FOR INTERACTIONS WITH ELECTRONIC CONTENT

BACKGROUND

In a computerized content delivery network, electronic content items are frequently distributed from a content server to a plurality of user devices. A system for accounting for interactions with the distributed content items (e.g., by a user or a user device) is an important component of any content delivery network because it provides a mechanism for collecting revenue from content providers.

Typically, such accounting is accomplished by having the content items direct a user's web browser to a server that records the interaction. The server then issues a redirect which causes the user's web browser to navigate to a content provider's landing page. This redirect chain is typically executed in series and often introduces observable latency into the redirect process.

SUMMARY

One implementation of the present disclosure is a method for reliably using ping to account for interactions with electronic content. The method includes receiving, at one or more servers, a request for a content item from a user device and selecting a content item in response to the request; determining, by the one or more servers, whether the user device is ping enabled; and generating, by the one or more servers, a hyperlink for inclusion with the selected content item. The hyperlink has a target URL and a ping attribute. At least one of the target URL and the ping attribute is based on a result of the determination whether the user device is ping enabled. The method further includes distributing, by the one or more servers, the selected content item and the generated hyperlink to the user device and receiving, at the one or more servers, a ping request from the user device. The ping request is received at the one or more servers in response to an interaction with the distributed content item if the user device is ping enabled. The ping request includes the target URL and an identifier of the distributed content item. The method further includes accounting for the interaction with the distributed content item in response to receiving the ping request from the user device.

In some implementations, the method further includes causing the user device to store a ping identifier in a local memory of the user device in response to the detected interaction with the distributed content item. The ping identifier is associated with the ping request received from the user device if the user device is ping enabled. The method may further include receiving, at the one or more servers, a second request for a content item from the user device, the second request including the stored ping identifier, and determining whether the ping request associated with the ping identifier was previously received from the user device. The method may further include identifying the user device as ping enabled in response to a determination that the associated ping request was previously received.

In some implementations, the method further includes receiving, at the one or more servers, a redirect request from the user device and determining whether to account for the interaction using the ping request or the redirect request. In some implementations, the method further includes storing, in a profiles database, an indication that the ping request was received from the user device in response to receiving the ping request. Determining whether the user device is ping enabled may include retrieving information from the profiles database.

In some implementations, the target URL is based on a result of the determination whether the user device is ping enabled. If the user device is determined to be non-ping enabled, the target URL may direct the user device to a resource associated with the one or more servers for recording the interaction with the distributed content item using a redirect-based accounting technique. If the user device is determined to be ping enabled, the target URL may direct the user device to a landing page associated with the distributed content item without directing the user device to a resource associated with the one or more servers. If the user device is determined to be not ping enabled, the target URL may include both a URL associated with the accounting server and a URL associated with a landing page for the distributed content item.

In some implementations, the ping attribute is based on a result of the determination whether the user device is ping enabled. If the user device is determined to be ping enabled, the ping attribute may include a URL associated with the one or more servers for recording the interaction with the distributed content item using a ping-based accounting technique.

In some implementations, the method further includes removing the ping attribute from the hyperlink in response to a determination that the user device is not ping enabled.

Another implementation of the present disclosure is a system for reliably using ping to account for interactions with electronic content. The system includes one or more servers configured to receive a request for a content item from a user device and select a content item in response to the request. The one or more servers are further configured to determine whether the user device is ping enabled and generate a hyperlink for inclusion with the selected content item. The hyperlink has a target URL and a ping attribute. At least one of the target URL and the ping attribute is based on a result of the determination whether the user device is ping enabled. The one or more servers are further configured to distribute the selected content item and the generated hyperlink to the user device and receive a ping request from the user device. The ping request is received in response to an interaction with the distributed content item if the user device is ping enabled. The ping request includes the target URL and an identifier of the distributed content item. The one or more servers are further configured to account for the interaction with the distributed content item in response to receiving the ping request from the user device.

In some implementations, the one or more servers are further configured to cause the user device to store a ping identifier in a local memory of the user device in response to the detected interaction with the distributed content item. The ping identifier may be associated with the ping request received from the user device. The one or more servers may be further configured to receive a second request for a content item from the user device, the second request including the stored ping identifier. The one or more servers may be further configured to determine whether the ping request associated with the ping identifier was previously received from the user device and identify the user device as ping enabled in response to a determination that the associated ping request was previously received.

In some implementations, the one or more servers are further configured to receive a redirect request from the user device; and determine whether to account for the interaction using the ping request or the redirect request. In some implementations, one or more servers are further configured to store, in a profiles database, an indication that the ping request was received from the user device in response to receiving the ping request. Determining whether the user device is ping enabled may include retrieving information from the profiles database.

In some implementations, the target URL is based on a result of the determination whether the user device is ping enabled. If the user device is determined to be non-ping enabled, the target URL may direct the user device to a resource associated with the one or more servers for recording the interaction with the distributed content item using a redirect-based accounting technique. If the user device is determined to be ping enabled, the target URL may direct the user device to a landing page associated with the distributed content item without directing the user device to a resource associated with the one or more servers. If the user device is determined to be not ping enabled, the target URL may include both a URL associated with the accounting server and a URL associated with a landing page for the distributed content item.

In some implementations, the ping attribute is based on a result of the determination whether the user device is ping enabled. If the user device is determined to be ping enabled, the ping attribute may include a URL associated with the one or more servers for recording the interaction with the distributed content item using a ping-based accounting technique.

In some implementations, the one or more servers are further configured to remove the ping attribute from the hyperlink in response to a determination that the user device is not ping enabled.

Another implementation of the present disclosure is one or more computer-readable storage media having instructions stored therein, the instructions being executable by one or more processors to cause the one or more processors to perform operations including receiving a request for a content item from a user device and selecting a content item in response to the request, determining whether the user device is ping enabled, and generating a hyperlink for inclusion with the selected content item. The hyperlink having a target URL and a ping attribute. At least one of the target URL and the ping attribute is based on a result of the determination whether the user device is ping enabled. The operations performed by the one or more processors further include distributing the selected content item and the generated hyperlink to the user device and receiving a ping request from the user device. The ping request is received from the user device in response to an interaction with the distributed content item if the user device is ping enabled. The ping request includes the target URL and an identifier of the distributed content item. The operations performed by the one or more processors further include accounting for the interaction with the distributed content item in response to receiving the ping request from the user device.

In some implementations, the operations performed by the one or more processors further include causing the user device to store a ping identifier in a local memory of the user device in response to the detected interaction with the distributed content item; receiving a second request for a content item from the user device, the second request including the stored ping identifier; determining whether the ping request associated with the ping identifier was previously received from the user device; and identifying the user device as ping enabled in response to a determination that the associated ping request was previously received. The ping identifier may be associated with the ping request received from the user device if the user device is ping enabled.

In some implementations, the operations performed by the one or more processors further include receiving a redirect request from the user device and determining whether to account for the interaction using the ping request or the redirect request.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
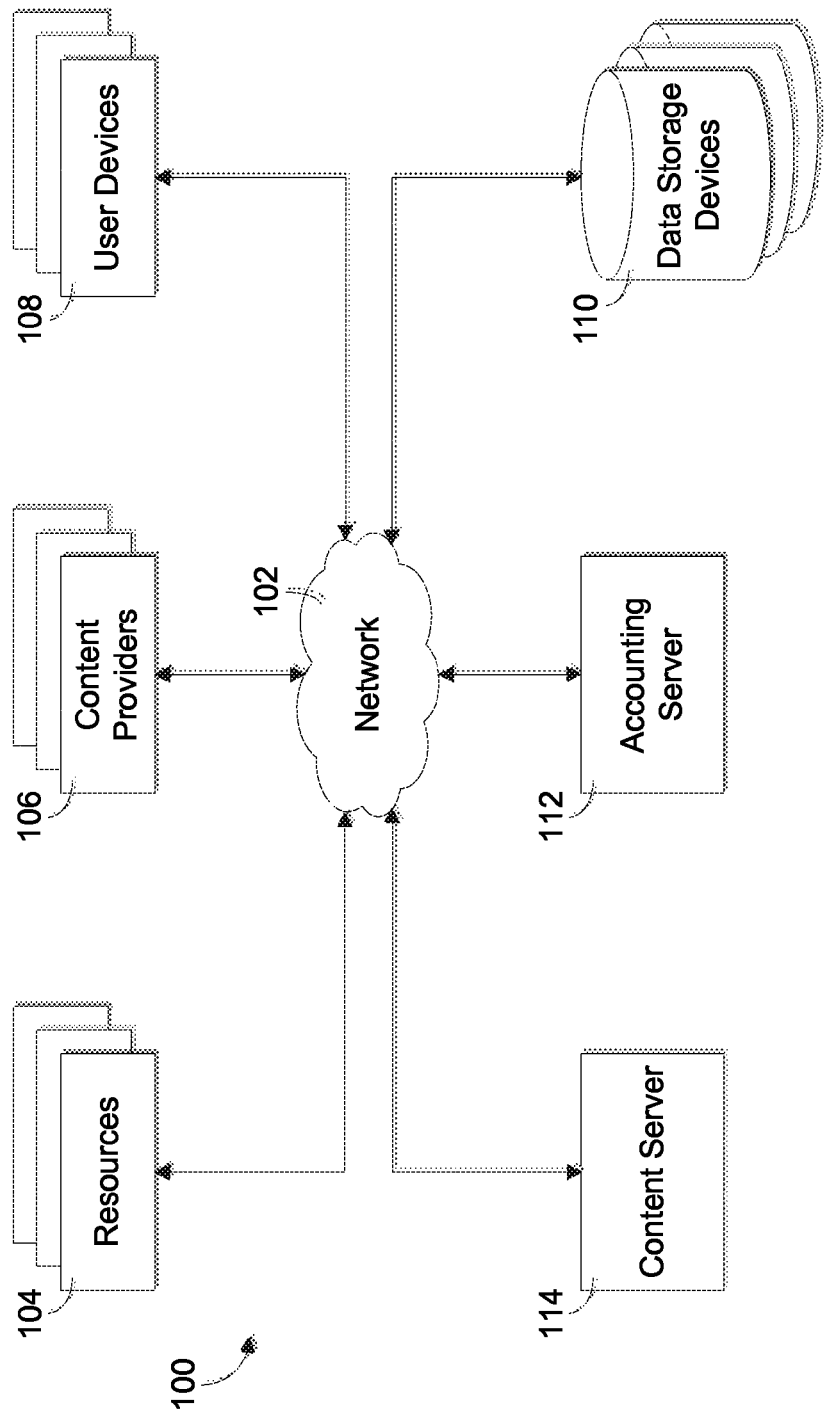
FIG. 1 is a block diagram of a computer system which may be used to account for interactions with electronic content using ping and which is shown to include a network, resources, content providers, user devices, data storage devices, an accounting server, and a content server, according to a described implementation.

Referring generally to the FIGURES, systems and methods for ping-based accounting for interactions with content items are shown and described. The systems and methods described herein may be used to measure and/or record user interactions (e.g., impressions, clicks, conversions, etc.) associated with electronic content items distributed via a computer network (e.g., the Internet).

Advantageously, the user interactions may be accounted for using the "ping" attribute introduced for the "anchor" (e.g., <a>) and "area" (e.g., <area>) hyperlink elements in HTML5 (e.g., in the WHATWG specification of HTML5). For example, a distributed content item may include a hyperlink having a target URL (e.g., given by an "href" attribute) and an optional ping attribute. The ping attribute can be used to specify one or more URLs to which a "ping request" should be sent in response to a user interaction with the content item (e.g., clicking on the content item). The ping request can include the target URL as well as an indication of the particular content item with which the hyperlink is associated. Advantageously, the HTML ping attribute can be used to set and read cookies on the user device. In some implementations, the ping attribute specifies a URL of an accounting server to which the ping request should be sent. The accounting server can use the information included in the ping request to identify a particular content item and record an interaction with the identified content item.

In some implementations, using the ping attribute to notify the accounting server of interactions with content items eliminates the need to rely on traditional redirect-based accounting techniques. For example, the target URL of the hyperlink included with a distributed content item can be modified to direct a user device to a landing page without directing the user device through the accounting server as part of a redirect chain. The ping request can be sent to the accounting server as part of a POST request executed by a user's web browser concurrently with navigation to the landing page. In some implementations, a single ping attribute can ping multiple URLs (e.g., multiple redirect URLs in a redirect chain) in parallel with navigation to the landing page. Advantageously, because the ping request can occur in parallel with navigation to the target URL, no extra latency is introduced into the accounting process.

The systems and methods of the present disclosure address several difficulties in using the HTML ping attribute to account for interactions with content items. For example, one challenge presented by the use of ping is that user agents (e.g., web browsers, user devices, etc.) may allow users to disable ping. Many user agents allow ping to be disabled for third-party URLs or altogether. Furthermore, most user agents do not report whether ping is enabled or disabled. If ping is disabled, the accounting server may not be notified of the interaction because the ping request may never be sent from the user device. Consequently, ping-based accounting for interactions with content items may not be a viable option if a user has disabled ping.

Advantageously, the systems and methods described herein may be used to determine whether a user has ping enabled or disabled and automatically select an accounting technique (e.g., a redirect-based accounting technique or a ping-based accounting technique) based on a result of the determination. For example, a content server may receive a request for a content item from a user device and determine whether the user device has ping enabled or disabled by referencing a profiles database. The profiles database may store ping information (e.g., whether a user device has ping enabled or disabled) for a plurality of user devices. The profiles database may also store information relating to the most recent pings received from the plurality of user devices. The most recent ping information may then be used to determine whether a user device is ping enabled or ping disabled.

If the profiles database indicates that the user device has ping disabled (e.g., explicitly or implicitly based on received pings) or if the content request is the first content request received from the user device, the content server may distribute a content item having both a traditional redirect href and a ping attribute. In response to a user interaction with the content item, a Javascript® handler may be used to store a ping identifier on the user device. The ping identifier may be a cookie or other indication of an interaction with the distributed content item. If the user device has ping enabled, the ping attribute may cause the user device to send a ping request to the accounting server in parallel with storing the ping identifier on the user device. If the accounting server receives the ping request, the accounting server may update the profiles database to indicate that the user device is "ping enabled" (e.g., capable of communicating with the accounting server using ping).

The next time the same user device requests a content item from the content server, the ping identifier may be sent to the content server as part of the content request. The content server can use the received ping identifier as an indication that a ping request should have been received by the accounting server if the user device is ping enabled. If a ping request corresponding to the ping identifier was received, the user device may be identified as a ping enabled device. However, if the ping request corresponding to the ping identifier was not received, the user device may be classified or identified as a "ping disabled" or "ping blocker" device.

Advantageously, the systems and methods described herein may provide a substantially reliable protocol for using the HTML ping attribute to record interactions with electronic content. The substantial reliability of the described protocol may result from the ability to record substantially all electronic content interactions (e.g., all but a single interaction for a particular user device). In most cases, the ping-based accounting technique may fail to record a maximum of a single interaction with an electronic content item (e.g., when a user device transitions from a ping enabled state to a ping disabled state). However, even if the ping-based accounting method fails to record an interaction, the ping identifier received as part of a subsequent content request can be used to recover the interaction. In other words, the ping identifier may be used to recover and account for a previously unrecorded interaction (e.g., a "lost click").

If the user device is identified as ping enabled, the content server may distribute a content item having a modified target URL which does not redirect through the accounting server. In some implementations, the target URL may direct the user device directly to a landing page associated with the distributed content item. The distributed content item may also include a ping attribute which causes the user device to send a ping request to the accounting server in response to an interaction with the content item. Because the ping request can occur in parallel with navigation to the target URL, no extra latency is introduced into the accounting process. In some implementations, the content server distributes a content item having both a target URL which would direct the user device through the accounting server and a ping attribute. An on-click handler executing on the user device may change the target URL to the URL of the landing page and remove the accounting redirect.

Referring now to FIG. 1, a block diagram of a computer system 100 is shown, according to a described implementation. In brief overview, computer system 100 is shown to include a network 102, resources 104, content providers 106, user devices 108, data storage devices 110, an accounting server 112, and content server 114. Computer system 100 may facilitate communication between resources 104, content providers 106, user devices 108, and content server 114. For example, user devices 108 may request and receive resource content (e.g., web pages, documents, etc.) from resources 104 via network 102. In some implementations, resources 104 may include content item slots for presenting third-party content items from content providers 106. Content server 114 may receive a request for a content item from user devices 108, select an eligible content item in response to the request, and distribute the content item to user devices 108 via network 102. The content item may be selected from a database of potential content items created or otherwise provided by content providers 106.

Computer system 100 may also facilitate communication between user devices 108, content server 114, and accounting server 112. For example, content server 114 may determine whether a user device is ping enabled in response to receiving a request for content from user devices 108. Content server 114 may communicate with accounting server 112 or retrieve profile data from data storage devices 110 to make such a determination. In some implementations, user devices 108 may be redirected through accounting server 112 in response to a detected interaction with a distributed content item (e.g., clicking on the content item). In other implementations, user devices 108 may send a ping request to accounting server 112 in response to an interaction with a distributed content item. The ping request may be sent in place of or in addition to a traditional redirect through accounting server 112.

Still referring to FIG. 1, and in greater detail, computer system 100 is shown to include a network 102. Network 102 may be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, user devices 108 may communicate wirelessly (e.g., via WiFi, cellular, radio, etc.) with a transceiver that is hardwired (e.g., via a fiber optic cable, a CAT5 cable, etc.) to a computing device of network 102.

Still referring to FIG. 1, computer system 100 is shown to include resources 104. Resources 104 may include any type of information or data structure that can be provided over network 102. In some implementations, resources 104 may be identified by a resource address associated with each resource (e.g., a uniform resource locator (URL)). Resources 104 may include web pages (e.g., HTML web pages, PHP web pages, etc.), word processing documents, portable document format (PDF) documents, images, video, programming elements, interactive content, streaming video/audio sources, or other types of electronic information. Resources 104 may include content (e.g., words, phrases, images, sounds, etc.) having embedded information (e.g., meta-information embedded in hyperlinks) and/or embedded instructions. Embedded instructions may include computer-readable instructions (e.g., software code, JavaScript®, ECMAScript®, etc.) which are executed by user devices 108 (e.g., by a web browser running on user devices 108).

In some implementations, resources 104 may include content slots for presenting third-party content items. For example, resources 104 may include one or more inline frame elements (e.g., HTML "iframe" elements, <iframe> . . . </iframe>) for presenting third-party content items from content providers 106. An inline frame can be the "target" frame for links defined by other elements and can be selected by user agents (e.g., user devices 108, a web browser running on user devices 108, etc.) as the focus for printing, viewing its source, or other forms of user interaction. The content slots may cause user devices 108 to request third-party content items from content server 114 in response to viewing first-party resource content from resources 104.

Still referring to FIG. 1, computer system 100 is shown to include content providers 106. Content providers 106 may include one or more electronic devices representing advertisers, resource operators, business owners, or other entities using the services provided by content server 114 and accounting server 112. In some implementations, content providers 106 may produce content items (e.g., an ad creative) for presentation to user devices 108. In other implementations, content providers 106 may submit a content generation request to content server 114 and content server 114 may automatically generate a content item in response to the request. The content items may be stored in one or more data storage devices local to content providers 106, within content server 114, or in data storage devices 110.

In some implementations, the content items may be advertisements. The advertisements may be display advertisements such as image advertisements, Flash® advertisements, video advertisements, text-based advertisements, or any combination thereof. In other implementations, the content items may include other types of content which serve various non-advertising purposes. The content items may be displayed in a content slot of resources 104 and presented (e.g., alongside other resource content) to user devices 108.

In some implementations, content providers 106 may submit campaign parameters to content server 114. The campaign parameters may be used to control the distribution of content items to user devices 108. The campaign parameters may include keywords associated with the content items, bids corresponding to the keywords, a content distribution budget, geographic limiters, or other criteria used by content server 114 to determine when a content item may be presented to user devices 108.

Content providers 106 may access content server 114 to monitor the performance of the content items distributed according to the established campaign parameters. For example, content providers 106 may access content server 114 to review one or more behavior metrics associated with a content item or set of content items. The behavior metrics may describe the interactions between user devices 108 with respect to a distributed content item or set of content items (e.g., number of impressions, number of clicks, number of conversions, an amount spent, etc.).

Still referring to FIG. 1, computer system 100 is shown to include user devices 108. User devices 108 may include any number and/or type of user-operable electronic devices. For example, user devices 108 may include desktop computers, laptop computers, smartphones, tablets, mobile communication devices, remote workstations, client terminals, entertainment consoles, or any other devices capable of interacting with the other components of computer system 100 (e.g., via a communications interface). For example, user devices 108 may be capable of receiving resource content from resources 104 and/or third-party content items from content providers 106 or content server 114. User devices 108 may include mobile devices or non-mobile devices.

In some implementations, user devices 108 include an application (e.g., a web browser, a resource renderer, etc.) for converting electronic content into a user-comprehensible format (e.g., visual, aural, graphical, etc.). User devices 108 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.). User devices 108 may function as a user agent for allowing a user to view HTML encoded content. User devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a third-party content item is presented.

User devices 108 may be classified at a particular time as either "ping enabled" user devices or "not ping enabled" user devices. User devices 108 which are ping enabled may be capable of communicating with accounting server 112 using ping. For example, ping enabled user devices may be capable of reading a ping attribute within a ping-enabled hyperlink (e.g., an anchor element including both a href attribute and a ping attribute) and sending a ping request to accounting server 112 in response to following the ping-enabled hyperlink. An example ping-enabled hyperlink is shown as follows:

<a    href="landing_page.com"    ping="http://accounting_domain.net?sig=sig">

In the example ping-enabled hyperlink, "landing_page.com" is the target URL given by the href attribute (e.g., a URL for a target resource), "accounting_domain.net" is the URL of accounting server 112, and "sig" is an electronic signature identifying a particular content item.

User devices 108 which are not ping enabled may be incapable of communicating with accounting server 112 using ping or may have ping functionality blocked or disabled. For example, current HTML standards require user agents to allow users to disable ping if desired, either entirely or selectively (e.g., for third-party URLs). User devices 108 which are not ping enabled do not send a ping request to accounting server 112 in response to following a ping-enabled hyperlink. Whether a particular user device is ping enabled or ping disabled may be a dynamic characteristic. User devices 108 may transition between being ping enabled and being ping disabled (e.g., ping enabled to ping disabled, ping disabled to ping enabled) over time.

In some implementations, user devices 108 may be capable of detecting an interaction with a distributed content item. An interaction with a content item may include displaying the content item, hovering over the content item, clicking on the content item, viewing source information for the content item, or any other type of interaction between user devices 108 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item), by content providers 106, or by content server 114.

User devices 108 may be configured to execute computer-readable instructions (e.g., software code, Javascript®, ECMAScript®, etc.) in response to a detected interaction with a content item. In some implementations, user devices 108 include a Javascript® on-click handler. The on-click handler may change a target URL of a distributed content item to the URL of the landing page (e.g., by removing the accounting redirect) when a content item is distributed using the ping-based accounting technique. The on-click handler may cause user devices 108 to store a ping identifier in response to a detected interaction with a content item. The ping identifier may be a cookie or other indication that a user device interacted with a particular content item. For example, the ping identifier may be a "_icanping_=sig" cookie, where the element "sig" is a signature identifying a particular content item. User devices 108 may include local data storage (e.g., a magnetic disc, a solid state memory device, etc.) for storing the ping identifier. The ping identifier may be stored on user devices 108 for the domain corresponding to content server 114 (e.g., the source of the content item). In some implementations, the ping identifier is sent from user devices 108 to content server 114 in response to a future request for content from content server 114.

Still referring to FIG. 1, computer system 100 is shown to include data storage devices 110. Data storage devices 110 may be any type of memory device capable of storing profile data, content item data, accounting data, or any other type of data used by content server 114 and/or accounting server 112. Data storage devices 110 may include any type of non-volatile memory, media, or memory devices. For example, data storage devices 110 may include semiconductor memory devices (e.g., EPROM, EEPROM, flash memory devices, etc.) magnetic disks (e.g., internal hard disks, removable disks, etc.), magneto-optical disks, and/or CD-ROM and DVD-ROM disks. In some implementations, data storage devices 110 may be local to content server 114, accounting server 112, or content providers 106. In other implementations, data storage devices 110 may be remote data storage devices connected with accounting server 112 and/or content server 114 via network 102. In some implementations, data storage devices 110 may be part of a data storage server or system capable of receiving and responding to queries from content server 114.

In some implementations, data storage devices 110 store profile data for user devices 108. For example, data storage devices 110 may store an indication of whether user devices 108 are ping enabled or not ping enabled. In some implementations, data storage devices may include a "ping_enabled" attribute for each of user devices 108. The ping_enabled attribute may be a binary attribute indicating whether the user device is ping enabled (e.g., ping_enabled=true) or not ping enabled (e.g., ping_enabled=false). In some implementations, data storage devices 110 store an indication of a time at which the ping_enabled attribute was last updated.

Data storage devices 110 may be referenced or queried by content server 114 in determining whether to distribute a content item with a ping-enabled hyperlink or a non-ping-enabled hyperlink to a particular user device. For example, content server 114 may query data storage devices 110 in response to a request for a content item from a user device. The query may include a device identifier (e.g., identifying a particular user device) and a request for information regarding whether the user device is classified as ping enabled or not ping enabled. In some implementations, all user devices may be initially classified as not ping enabled. A user device may be reclassified as ping enabled once a ping request is successfully received from the user device. For example, accounting server 112 may update the ping_enabled attribute stored in data storage devices 110 for a user device in response to receiving a ping request from the user device.

Still referring to FIG. 1, computer system 100 is shown to include a content server 114. Content server 114 may be configured to receive requests for content items from user devices 108. Content server 114 may select an eligible content item in response to the request. The selected content item may be associated with a particular landing page to which a user device should be directed (e.g., directly or indirectly) in response to interacting with the content item.

Content server 114 may be configured to determine whether a user device is ping enabled or not ping enabled (e.g., by referencing or querying data storage devices 110). If a user device is ping enabled, content server 114 may generate a ping-enabled hyperlink including both a target URL and a ping attribute and distribute the selected content item to the user device along with the ping-enabled hyperlink. If a user device is not ping enabled, content server 114 may generate a redirect hyperlink and distribute the selected content item to the user device along with the redirect hyperlink. In some implementations, content server 114 may generate a redirect hyperlink including an optional ping attribute to test whether a user device has changed from being not ping enabled to being ping enabled. Content server 114 is described in greater detail with reference to FIG. 2.

Still referring to FIG. 1, computer system 100 is shown to include an accounting server 112. Accounting server 112 may be configured to account for interactions with the content items distributed to user devices 108. Accounting server 112 may be capable of using both a redirect-based accounting technique and a ping-based accounting technique to record content interactions. Accounting server 112 may use the redirect-based accounting technique to account for content interactions when a hyperlink included with a distributed content item has a target URL (e.g., given by the href attribute) which refers initially to a domain associated with accounting server 112. Accounting server 112 may use the ping-based accounting technique to account for content interactions when a hyperlink included with a distributed content item has a ping attribute which specifies a domain associated with accounting server 112. Examples of such hyperlinks are provided with reference to FIG. 2.

In some implementations, accounting server 112 is configured to write an entry in a profiles database in response to receiving a ping request from a user device. For example, accounting server 112 may update an entry in a database stored on data storage devices 110 indicating that a user device is ping enabled in response to receiving a ping request from the user device. In some implementations, accounting server 112 records a time at which the ping request was received in the profiles database. In some implementations, accounting server 112 may be combined with content server 114. For example, a single server or computer system may receive requests for content items, distribute content items in response to the requests, receive notifications of interactions with the distributed content items, and account for the interactions. Accounting server 112 is described in greater detail with reference to FIG. 3.

Figure 2:
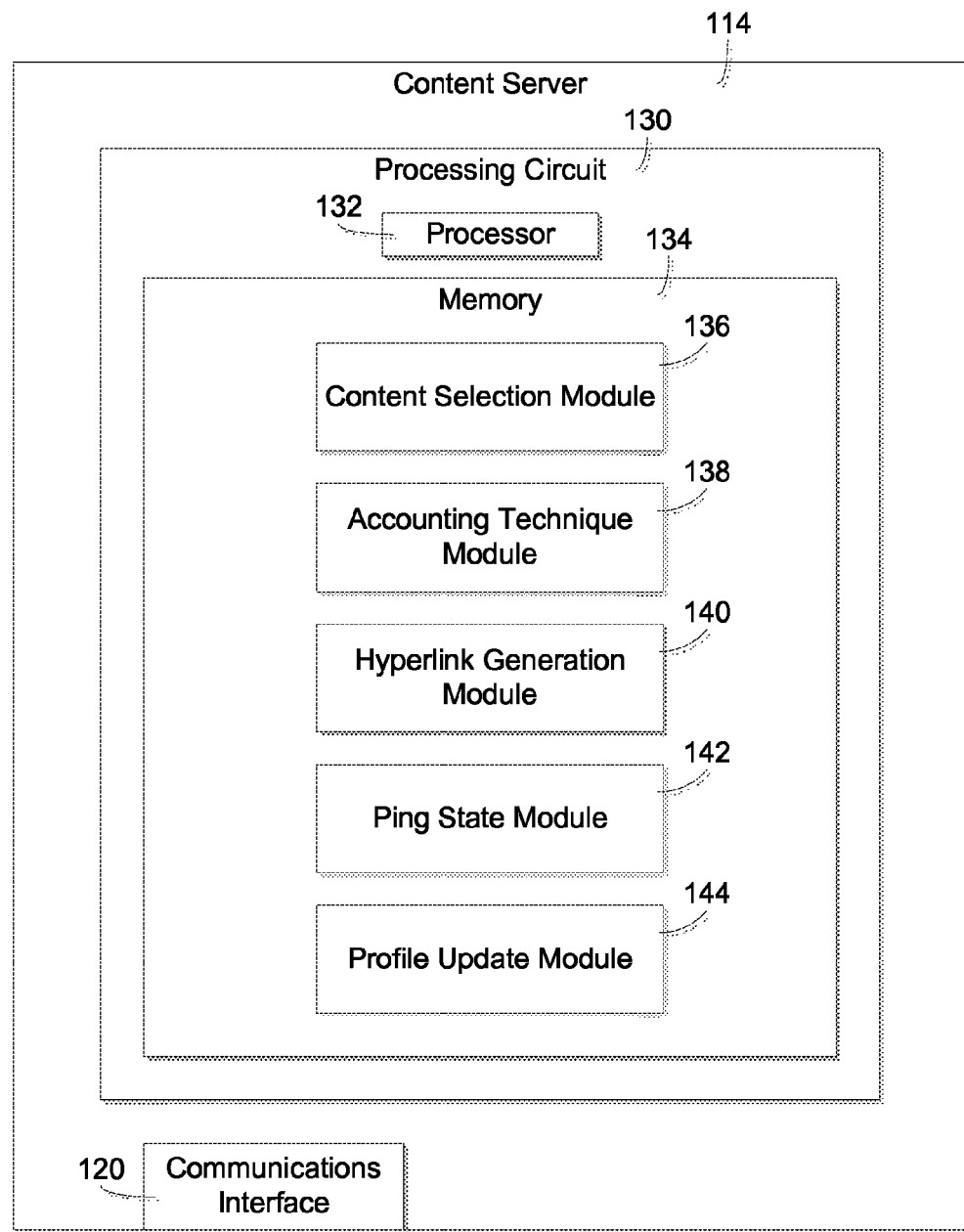
FIG. 2 is a block diagram illustrating in greater detail the content server of FIG. 1, the content server shown to include a content selection module, an accounting technique module, a hyperlink generation module, a ping state module, and a profile update module, according to a described implementation.

Referring now to FIG. 2, a detailed block diagram of content server 114 is shown, according to a described implementation. Content server 114 is shown to include a communications interface 120 and a processing circuit 130. Communications interface 120 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 120 may allow content server 114 to communicate with network 102, resources 104, content providers 106, user devices 108, data storage devices 110, and accounting server 112.

Still referring to FIG. 2, processing circuit 130 is shown to include a processor 132 and memory 134. Processor 132 may be implemented as a general purpose processor, an application specific integrated circuit (ASIC), one or more field programmable gate arrays (FPGAs), a CPU, a GPU, a group of processing components, or other suitable electronic processing components.

Memory 134 may include one or more devices (e.g., RAM, ROM, flash memory, hard disk storage, etc.) for storing data and/or computer code for completing and/or facilitating the various processes, layers, and modules described in the present disclosure. Memory 134 may comprise volatile memory or non-volatile memory. Memory 134 may include database components, object code components, script components, or any other type of information structure for supporting the various activities and information structures described in the present disclosure. In some implementations, memory 134 is communicably connected to processor 132 via processing circuit 130 and includes computer code (e.g., data modules stored in memory 134) for executing one or more processes described herein. In brief overview, memory 134 is shown to include a content selection module 136, an accounting technique module 138, a hyperlink generation module 140, a ping state module 142, and a profile update module 144.

Still referring to FIG. 2, and in greater detail, memory 134 is shown to include a content selection module 136. Content selection module 136 may receive a request for a content item (e.g., via communications interface 120) from resources 104 and/or user devices 108. In some implementations, the request for content items may include characteristics of one or more content slots in which the content items will be displayed. For example, such characteristics may include the URL of the resource 104 in which the content slot is located, a display size of the content slot, a position of the content slot, and/or media types that are available for presentation in the content slot. If the content slot is located on a search results page, keywords associated with the search query may also be provided to content selection module 136. The characteristics of the content slot and/or keywords associated with the content request may facilitate identification of content items that are relevant to resources 104 and/or to the search query.

Content selection module 136 may select an eligible content item in response to the request received from resources 104 or user devices 108. In some implementations, eligible content items may include content items having characteristics matching the characteristics of the content slots in which the content items are to be presented. For example, content selection module 136 may select a content item having a display size which fits in a destination content slot. In some implementations, content selection module 136 may resize a selected content item to fit a content slot or add additional visual content to the selected content item (e.g., padding, a border, etc.) based on the display size of the content item and the display size of the content slot.

In some implementations, content selection module 136 may select a content item determined to be relevant to particular resource 104, user device 108, or search query. For example, content selection module 136 may select a content item by comparing the keywords associated with each content item (e.g., specified by content providers 106, additional keywords extracted from the content item, etc.) with the keywords associated with the resource 104 or user device 108 requesting the content item. A topic or type of content included in resources 104 may be used to establish keywords for resources 104.

In some implementations, content selection module 136 may select a content item by comparing the keywords associated with each content item with information (e.g., profile data, user preferences, etc.) associated with a particular user device 108 requesting the content item. In some implementations, content selection module 136 may select a content item that does not match established user preferences if an insufficient number of preferred content items are available. In some implementations, content selection module 136 may select a content item based on an established click-through-rate, a predicted click-through-rate, a bid price associated with each content item, or other relevant selection criteria.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by content server 114) in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 108, etc.) and used by content server 114.

In some implementations, the selected content item is transmitted to resources 104 for presentation to user devices 108 along with any requested resource content from resources 104. In other implementations, the selected content item is delivered to the user devices 108 directly (e.g., without first transmitting the content item to resources 104) from content server 114 or from data storage devices 110. Content selection module 136 may assign each content item delivered to user devices 108 (e.g., directly or indirectly) a unique identifier (e.g., a signature attribute) such that a redirect URL or ping request received from user devices 108 can be associated with a particular content item.

Still referring to FIG. 2, memory 134 is shown to include an accounting technique module 138. Accounting technique module 138 may determine whether to use a redirect-based accounting technique or a ping-based accounting technique to account for interactions with the selected content item. Accounting technique module 138 may base the accounting technique determination on whether the user device 108 to which the content item will be distributed is ping enabled.

Ping enabled user devices may be defined as user devices 108 which have a demonstrated ability to communicate with accounting server 112 using ping. For example, ping enabled user devices may have previously demonstrated an ability to read a ping attribute within a ping-enabled hyperlink (e.g., an anchor element including both a href attribute and a ping attribute) and send a ping request to accounting server 112 in response to following the ping-enabled hyperlink. User devices 108 which are not ping enabled may be incapable of communicating with accounting server 112 using ping or may have ping functionality blocked or disabled. For example, user devices 108 which are not ping enabled may have not demonstrated an ability to send a ping request to accounting server 112 in response to following a ping-enabled hyperlink.

In some implementations, accounting technique module 138 may determine whether a user device is ping enabled by referencing or querying a profiles database. The profiles database may be stored on data storage devices 110 or another memory device accessible by content server 114. The profiles database may store a "ping_enabled" attribute for each of user devices 108. The ping_enabled attribute may be a binary attribute indicating whether a particular user device is ping enabled (e.g., ping_enabled=true) or not ping_enabled (e.g., ping_enabled=false). Accounting technique module 138 may query the profiles database by submitting a device identifier (e.g., identifying a particular user device) and a request for information regarding whether the user device identified by the device identifier is ping enabled.

In some circumstances, accounting technique module 138 may determine that a user device is ping enabled. For example, accounting technique module 138 may determine that a user device is ping enabled if a ping request has previously been received from the user device. In other circumstances, accounting technique module 138 may determine that a user device is not ping enabled. For example, accounting technique module 138 may determine that a user device is not ping enabled if a ping request has not previously been received from the user device.

In some implementations, accounting technique module 138 may subdivide user devices which are not ping enabled into two subgroups—confirmed ping blockers and unconfirmed ping blockers. Accounting technique module 138 may classify a user device as a confirmed ping blocker in response to a determination that a ping request should have been received from the user device if ping were enabled, when no ping request was actually received. Accounting technique module 138 may determine whether a ping request should have been received from a user device using input from ping state module 142, described in greater detail below. Accounting technique module 138 may determine whether a ping request was actually received using input from the profiles database and/or accounting server 112.

Accounting technique module 138 may classify a user device as an unconfirmed ping blocker in response to a determination that a ping request has not been received from the user device when no ping request was expected to have been received. In other words, accounting technique module 138 may classify a user device as an unconfirmed ping blocker if the user device has not yet demonstrated an ability to communicate with accounting server 112 using ping, but has not been classified as a confirmed ping blocker. For example, a user device may be classified as an unconfirmed ping blocker if the user device has not been sent a ping-enabled hyperlink and therefore has not yet been provided an opportunity to demonstrate an ability to communicate with accounting server 112 using ping. This situation may arise the first time a content item is requested by a user device.

In some implementations, accounting technique module 138 may use input from the profiles database and/or accounting server 112 to determine a time at which a ping request was most recently received from a user device. Accounting technique module 138 may classify a user device as an unconfirmed ping blocker if a threshold amount of time has passed since the most recent ping was received from the user device. Advantageously, by classifying a user device as an unconfirmed ping blocker, accounting technique module 138 may trigger a "probe and verify" process to determine whether the user device has transitioned from being ping enabled to being a ping blocker. The probe and verify process may be used to accurately classify user devices 108 to ensure that the ping-based accounting technique is reliable for the user devices 108 with which it is used. Accounting technique module 138 may output a result of the determination whether a user device is ping enabled (and optionally whether a user device is a confirmed or unconfirmed ping blocker) to hyperlink generation module 140.

In some implementations, accounting technique module 138 may select the redirect-based accounting technique or the ping-based accounting technique based on reasons other than whether a particular user device is ping enabled. For example, accounting technique module 138 may select the redirect-based accounting technique in response to a statistical determination that the ping-based accounting technique is not performing as expected. If the ping-based accounting technique is not performing as expected (e.g., a large proportion of interactions are not accounted for, ping testing data is inaccurate, etc.) accounting technique module 138 can disable the ping-based accounting technique for all user devices or a subset of user devices. In some implementations, accounting technique module 138 may disable the ping-based accounting technique on an ongoing random basis to keep track of system performance.

Still referring to FIG. 2, memory 134 is shown to include a hyperlink generation module 140. Hyperlink generation module 140 may create, modify, transform, produce, or otherwise generate a hyperlink for inclusion with the content item selected by content selection module 136. In some implementations, the hyperlink is a HTML5 hyperlink.

Hyperlink generation module 140 may create a hyperlink by including a "href" attribute within an anchor (e.g., <a>) or area (e.g., <area>) element of the selected content item. The hyperlink may be included with the selected content item (e.g., integrated, attached, appended, embedded, etc.) such that interaction with the content item by a user device causes the user device to follow the hyperlink.

In some implementations, hyperlink generation module 140 may be capable of creating several different types of hyperlinks for inclusion with the selected content item. For example, hyperlink generation module 140 may be capable of creating a traditional redirect hyperlink, a ping-enabled hyperlink, and a hybrid redirect/ping-enabled hyperlink. Advantageously, the type of hyperlink created may be based on a result of the determination (e.g., by accounting technique module 138) whether the user device to which the selected content item is distributed is ping enabled (and optionally whether a user device is a confirmed or unconfirmed ping blocker).

For some content items, hyperlink generation module 140 may generate a traditional redirect hyperlink. In some implementations, hyperlink generation module 140 creates a traditional redirect hyperlink in response to a determination by accounting technique module 138 that the user device to which the selected content item will be distributed is a confirmed ping blocker. A traditional redirect hyperlink may include a href attribute without including a ping attribute. The href attribute of a traditional redirect hyperlink may initially direct a user device to a domain associated with accounting server 112. An example of a traditional redirect hyperlink is provided as follows:

<a href="http://accounting_domain.net?sig=sig&adurl=landing_page.com"> where "accounting_domain.net" is a domain associated with accounting server 112, "sig" is an electronic signature identifying a particular content item, and "landing_page.com" is the URL of the landing page to which user devices should be redirected by accounting server 112 after the interaction is recorded.

The landing page URL may be received from content providers 106 as part of the original content item. In some implementations, the landing page URL may be replaced with a URL of a secondary redirect server. For example, accounting server 112 may record the interaction and issue a redirect to a secondary redirect server which issues a second redirect (e.g., to the landing page, to a tertiary redirect server, etc.). In some implementations, hyperlink generation module 140 uses the unique identifier assigned to a content item by content selection module 136 as the signature attribute (e.g., "sig=unique_ID") of the redirect hyperlink. Accounting server 112 may use the signature attribute to identify a particular content item for attribution purposes.

For other content items, hyperlink generation module 140 may generate a ping-enabled hyperlink. In some implementations, hyperlink generation module 140 creates a ping-enabled hyperlink in response to a determination by accounting technique module 138 that the user device to which the selected content item will be distributed is ping enabled. A ping-enabled hyperlink may include both a href attribute and a ping attribute. An example ping-enabled hyperlink is provided as follows:

<a href="landing_page.com" ping="http://accounting_domain.net?sig=sig"> where "landing_page.com" is the target URL given by the href attribute (e.g., a URL for a target resource), "accounting_domain.net" is the URL of accounting server 112, and "sig" is an electronic signature identifying a particular content item.

Advantageously, a ping enabled hyperlink may direct a user device to the landing page without redirecting through accounting server 112. In some implementations, a ping-enabled hyperlink directs a user device directly to the landing page (e.g., without any redirects). For example, the href attribute included in a ping-enabled hyperlink may specify the URL of the landing page. Hyperlink generation module 140 may create a ping-enabled hyperlink which leads directly to the landing page when the landing page URL is known or can be predicted/extracted from the original href attribute. For example, the landing page URL may be received from content providers 106 or extracted as the value of the "adurl" attribute of a traditional redirect hyperlink, as shown above.

In other implementations, a ping-enabled hyperlink may direct a user device indirectly to the landing page (e.g., through one or more redirects). In some circumstances, it may be difficult to predict the landing page URL. For example, the URL provided by content providers 106 may not be a URL of the landing page, but rather a URL which leads through one or more servers or websites which eventually redirect to the landing page. If included in a traditional redirect hyperlink, the redirect chain for such a URL would begin with accounting server 112, continue through at least one additional redirect server other than accounting server 112, and terminate at the landing page.

Hyperlink generation module 140 may shorten the target URL by removing the initial redirect through accounting server 112, thereby shortening the redirect chain, without completely eliminating all redirects (e.g., through servers other than accounting server 112). Advantageously, because the initial redirect through accounting server 112 is removed from the redirect chain, a ping-enabled hyperlink may reduce the latency involved in directing a user device to the landing page.

The ping attribute of a ping-enabled hyperlink may cause a user's web browser to send a ping request to the URL specified by the ping attribute. For example, in the ping-enabled hyperlink shown above, the ping attribute has a value of "http://accounting_domain.net?sig=sig." Therefore, upon following the ping-enabled hyperlink, a user device may send a ping request to the URL "http://accounting_domain.net?sig=sig." Advantageously, the ping request may be executed as a POST request in parallel with navigation to the target URL, thereby optimizing the use of available network bandwidth and reducing the latency involved in reaching the landing page. In some implementations, hyperlink generation module 140 uses the unique identifier assigned to a content item by content selection module 136 as the signature element (e.g., "sig=unique_ID") of the ping attribute. Accounting server 112 may use the signature element to identify a particular content item for accounting purposes.

In some implementations, the functions performed by hyperlink generation module 140 may be distributed among content server 114 and user devices 108. For example, content server 114 may determine whether a user device is ping enabled or ping disabled and distribute a content item having a target URL configured to redirect through accounting server 112. The distributed content item may also include an indication of whether the user device is ping enabled or ping disabled. An on-click handler (e.g., Javascript® code) executing on the user device may modify the target URL to remove the redirect through accounting server 112 in response to a detected interaction with the distributed content item (e.g., in response to a user clicking on the content item). The on-click handler may be configured to convert a traditional redirect URL into a ping-enabled URL for user devices which are identified as ping enabled.

Advantageously, the on-click handler may be used to account for certain types of interactions which would not typically be interpreted as a "click" by a web browser executing on the user device (e.g., right-click then copy-and-paste). Content server 114 may instruct the on-click handler executing on the user device (e.g., via distributed Javascript® instructions) to modify the target URL so that the target URL does not redirect through accounting server 112 rather than initially distributing a pre-modified (e.g., ping-enabled) hyperlink.

For further content items, hyperlink generation module 140 may generate a hybrid redirect/ping-enabled hyperlink. In some implementations, hyperlink generation module 140 creates a hybrid redirect/ping-enabled hyperlink in response to a determination by accounting technique module 138 that the user device to which the selected content item will be distributed is an unconfirmed ping blocker. A hybrid redirect/ping-enabled hyperlink may have a both a href attribute and a ping attribute. An example hybrid redirect/ping-enabled hyperlink is shown as follows:

```
<a href="http://accounting_domain.net?sig=sig&adurl=
    landing_page.com"ping="http://accounting_domain.net/
    ping?sig=sig">
```

In a hybrid redirect/ping-enabled hyperlink, the href attribute may be the same or similar to the href attribute in the traditional redirect hyperlink as shown above. For example, the href attribute may direct a user device through accounting server 112 for recording an interaction with the distributed content item using a traditional redirect-based accounting technique. However, unlike a traditional redirect hyperlink, a hybrid redirect/ping-enabled hyperlink may also include a ping attribute.

The ping attribute of a hybrid redirect/ping-enabled hyperlink may cause a user device to ping accounting server 112 at the URL specified by the ping attribute when the hyperlink is followed (e.g., upon clicking the associated content item). In some implementations, the ping attribute of a hybrid redirect/ping-enabled hyperlink may be the same or similar as the ping attribute of a ping-enabled hyperlink. In other implementations, the ping attribute of a hybrid redirect/ping-enabled hyperlink may be different than the ping attribute of a ping-enabled hyperlink. For example, the URL included in the ping attribute of the hybrid redirect/ping-enabled hyperlink shown above includes the additional term "/ping." This additional term may cause the ping request to be sent to a specific component of accounting server 112 (e.g., a specific webpage or resource located at "http://accounting_domain.net/ping").

In some implementations, ping requests sent to this component of accounting server 112 may be used for ping testing purposes only (e.g., probing to determine whether a user device is capable of communicating with accounting server 112 using ping). Ping requests sent to the "/ping" component of accounting server 112 may not be recorded as independent interactions with the distributed content item because such interactions may have already been recorded using the traditional redirect-based accounting technique (e.g., by redirecting through accounting server 112 with the target URL).

In some implementations, hyperlink generation module 140 may use input from the profiles database and/or accounting server 112 to determine a time at which a ping request was most recently received from a user device. Hyperlink generation module 140 may generate a hybrid redirect/ping-enabled hyperlink if a threshold amount of time has passed since the most recent ping was received from the user device. Advantageously, hyperlink generation module 140 may create a hybrid redirect/ping-enabled hyperlink for ping testing purposes (e.g., to determine whether the user device has transitioned from being ping enabled to being a ping blocker, transitioned from being a ping blocker to being ping enabled, etc.).

Still referring to FIG. 2, memory 134 is shown to include a ping state module 142. Ping state module 142 may be configured to modify a distributed content item to include embedded instructions. Embedded instructions may include computer-readable instructions (e.g., software code, JavaScript®, ECMAScript®, etc.) which cause user devices 108 to perform actions instructed by the embedded instructions upon interacting with the associated content item.

In some implementations, ping state module 142 may integrate a Javascript® on-click handler with the distributed content item. The on-click handler may cause user devices 108 to store a ping identifier in response to a detected interaction with a content item. The ping identifier may be a cookie (e.g., an HTTP cookie, a browser cookie, a web cookie, etc.) or other indication that a user device interacted with a particular content item. For example, the ping identifier may be a "_icanping_=sig" cookie, where the element "sig" is a signature identifying a particular content item. The signature included in the ping identifier may match the signature included in the ping attribute of the associated content item.

The ping identifier may be stored within a local storage of user devices 108. In some implementations, ping state module 142 causes user devices 108 to store the ping identifier as a cookie for a domain associated with content server 114 (e.g., the source of the distributed content item). Accordingly, the ping identifier may be sent from user devices 108 to content server 114 as part of a future interaction between user devices 108 and content server 114. For example, a user device may communicate a stored ping identifier to content server 114 as part of a subsequent request for a content item. Ping state module 142 may receive the stored ping identifier from user devices 108.

Advantageously, ping state module 142 may use the ping identifiers received from user devices 108 to determine whether user devices 108 are ping enabled. For example, ping state module 142 may cause ping identifiers to be stored only for content items having a ping attribute and only upon interaction with such content items. Interaction by a user device with a content item having a ping attribute causes the user device to send a ping request to accounting server 112 if the user device is ping enabled. Therefore, the existence of a ping identifier on the user device may be used as an indicator that a user device should have sent a ping request to accounting server 112 if the user device is ping enabled.

Ping state module 142 may receive the stored ping identifiers from user devices 108. In response to receiving a stored ping identifier (e.g., an "_icanping_=sig" cookie), ping state module 142 may query or reference the profiles database (e.g., stored on data storage devices 110) or accounting server 112 to determine whether a ping request was received. Ping state module 142 may compare the signatures (e.g., "sig") of the ping requests received from the user device with the signature of the ping identifier received from the user device. If a signature match is found, ping state module 142 may determine that the user device is ping enabled. However, if a match is not found (e.g., a ping identifier was received but no ping request was received), ping state module 142 may determine that the user device is not ping enabled (e.g., a ping blocker or incapable of communicating with accounting server 112 using ping).

In some implementations, ping state module 142 may be configured to account for previously unrecorded interactions with distributed content items. For example, if ping state module 142 receives a ping identifier from a user device and determines that no ping request corresponding to the ping identifier was received, ping state module 142 may determine whether the interaction was accounted for using the redirect-based accounting technique. Ping state module 142 may use the signature attribute of the ping identifier to determine the type of hyperlink included with the associated content item (e.g., traditional redirect, ping-enabled, hybrid redirect/ping-enabled, etc.).

In some implementations, if the signature attribute of a received ping identifier corresponds to a content item distributed with a hybrid redirect/ping-enabled hyperlink, ping state module 142 may determine that the interaction resulting in the ping identifier was previously recorded (e.g., using the traditional redirect-based accounting technique) notwithstanding the fact that no ping request was received. However, if the signature attribute of a received ping identifier corresponds to a content item distributed with a ping-enabled hyperlink, ping state module 142 may determine that the interaction was previously unrecorded. Ping state module 142 may communicate with accounting server 112 and/or data storage devices 110 to account for and record previously unrecorded interactions.

Still referring to FIG. 2, memory 134 is shown to include a profile update module 144. Profile update module 144 may be configured to update the profiles database in response to a determination that a user device is not ping enabled (e.g., a ping blocker). Profile update module 144 may receive information from ping state module 142 regarding received ping identifiers. In some implementations, profile update module 144 compares the signature attributes of received ping identifiers with the signature attributes of received ping requests. Profile update module 144 may determine whether a user device is not ping enabled (e.g., if a ping identifier but no ping request was received from the user device) or ping enabled (e.g., a ping request was received from the user device) and update the profiles database accordingly.

Figure 3:
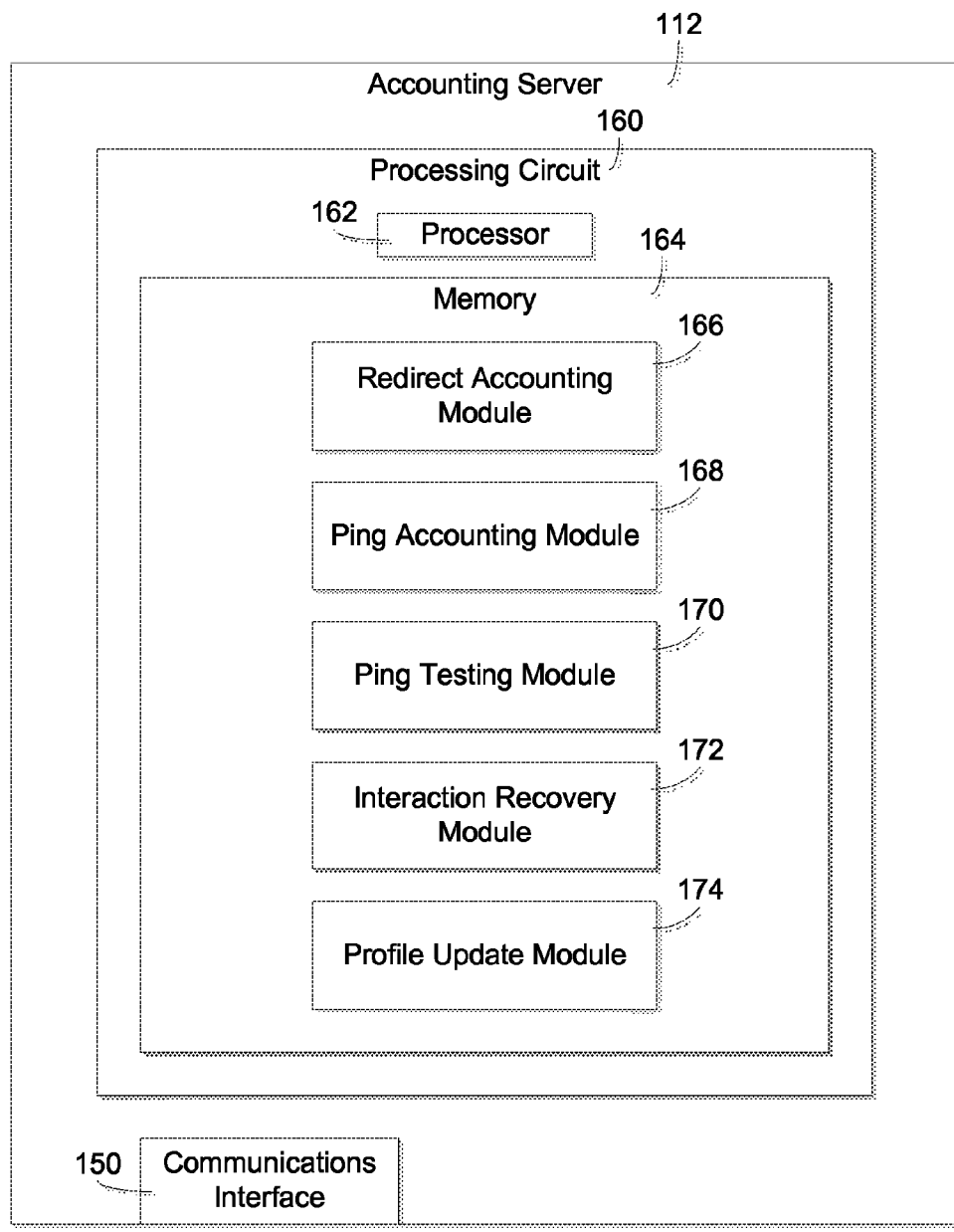
FIG. 3 is a block diagram illustrating in greater detail the accounting server of FIG. 1, the accounting server shown to include a redirect accounting module, a ping accounting module, a ping testing module, an interaction recovery module, and a profile update module, according to a described implementation.

Referring now to FIG. 3, a block diagram of accounting server 112 is shown, according to a described implementation. In some implementations, accounting server 112 may be combined with content server 114. For example, a single combined content/accounting server may perform the functions and have the capabilities of both accounting server 112 and content server 114. In other implementations, accounting server 112 and/or content server 114 may be split into multiple servers or computer systems and their functionalities may be divided among multiple disparate components.

Accounting server 112 is shown to include a communications interface 150 and a processing circuit 160. Communications interface 150 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 150 may allow accounting server 112 to communicate with network 102, resources 104, content providers 106, user devices 108, data storage devices 110, and content server 114.

Still referring to FIG. 3, processing circuit 160 is shown to include a processor 162 and memory 164. Processor 162 may be implemented as a general purpose processor, an application specific integrated circuit (ASIC), one or more field programmable gate arrays (FPGAs), a CPU, a GPU, a group of processing components, or other suitable electronic processing components.

Memory 164 may include one or more devices (e.g., RAM, ROM, Flash® memory, hard disk storage, etc.) for storing data and/or computer code for completing and/or facilitating the various processes, layers, and modules described in the present disclosure. Memory 164 may comprise volatile memory or non-volatile memory. Memory 164 may include database components, object code components, script components, or any other type of information structure for supporting the various activities and information structures described in the present disclosure. In some implementations, memory 164 is communicably connected to processor 162 via processing circuit 160 and includes computer code (e.g., data modules stored in memory 164) for executing one or more processes described herein. In brief overview, memory 164 is shown to include a redirect accounting module 166, a ping accounting module 168, a ping testing module 170, an interaction recovery module 172, and a profile update module 174.

Still referring to FIG. 3, and in greater detail, memory 164 is shown to include a redirect accounting module 166. Redirect accounting module 166 may account for interactions with distributed content items using a redirect-based accounting technique. For example, redirect accounting module 166 may receive a receive a request for resource content from user devices 108 in response to user devices 108 following a hyperlink having a href attribute linking to a domain associated with accounting server 112 (e.g., a traditional redirect hyperlink, a hybrid redirect/ping-enabled hyperlink, etc.). An example of such a hyperlink is provided as follows:

<a href="http://accounting_domain.net?sig=sig&adurl=landing_page.com"> where "accounting_domain.net" is a domain associated with accounting server 112, "sig" is an electronic signature identifying a particular content item, and "landing_page.com" is the URL of the landing page to which user devices should be redirected after the interaction is recorded.

Redirect accounting module 166 may parse the redirect hyperlink to extract the signature attribute and landing page URL. Redirect accounting module 166 may then record an interaction for the content item identified by the signature attribute and issue a redirect to the landing page URL. In some implementations, the landing page URL may be replaced with a URL of a secondary redirect server. For example, redirect accounting module 166 may record the interaction and issue a redirect to a secondary redirect server which issues a second redirect (e.g., to the landing page, to a tertiary redirect server, etc.).

Still referring to FIG. 3, memory 164 is shown to include a ping accounting module 168. Ping accounting module 168 may account for interactions with distributed content items using a ping-based accounting technique. For example, ping accounting module 168 may receive a ping request from user devices 108 in response to user devices 108 following a hyperlink having a ping attribute (e.g., a ping-enabled hyperlink, a hybrid redirect/ping-enabled hyperlink, etc.). An example of such a hyperlink is provided as follows:

<a href="landing_page.com" ping="http://accounting_domain.net?sig=sig"> where, "landing_page.com" is the target URL given by the href attribute (e.g., a URL for a target resource), "accounting_domain.net" is the URL of accounting server 112, and "sig" is an electronic signature identifying a particular content item.

In some implementations, ping accounting module 168 receives a ping request executed as a POST request in compliance with HTML5 standards. For example, the ping request may include the target URL (e.g., included as a "Ping-To" header) and optionally a URL of the resource or content item containing the hyperlink (e.g., included as an optional "Ping-From" or "Referer" attribute). Ping accounting module 168 may use the signature element of the ping attribute (e.g., "sig=unique_ID") to identify and account for an interaction with a particular content item. In some implementations, ping accounting module 168 identifies a particular user device from which the ping request was received. Ping accounting module 168 may determine that a user device is ping enabled in response to receiving a ping request from the user device.

Still referring to FIG. 3, memory 164 is shown to include a ping testing module 170. Ping testing module 170 may receive ping requests from user devices 108 for purposes of determining whether user devices 108 are ping enabled. For example, some content items may be distributed from content server 114 with a hybrid redirect/ping-enabled hyperlink. A hybrid redirect/ping-enabled hyperlink may have a both a href attribute and a ping attribute as shown below:

```
<a href="http://accounting_domain.net?sig=sig&adurl=
    landing_page.com"ping="http://accounting_domain.net/
    ping?sig=sig">
```

In some implementations, the ping attribute of a hybrid redirect/ping-enabled hyperlink may be different than the ping attribute of a ping-enabled hyperlink. For example, the URL included in the ping attribute of the hybrid redirect/ping-enabled hyperlink shown above includes the additional term "/ping." This additional term may cause the ping request to be sent to ping testing module 170 rather than ping accounting module 168.

In some implementations, ping requests sent to ping testing module 170 may be used for ping testing purposes only (e.g., to determine whether a user device is capable of communicating with accounting server 112 using ping). Ping requests sent to ping testing module 170 may not be recorded as independent interactions with the distributed content item because such interactions may have already been recorded by redirect accounting module 166 using the traditional redirect-based accounting technique (e.g., by redirecting through accounting server 112 with the target URL).

In some implementations, ping testing module 170 determines a time at which a ping request was most recently received from a user device. The ping request may be received by ping testing module 170 or ping accounting module 168. Ping testing module 170 may cause hyperlink generation module 140 to generate a hybrid redirect/ping-enabled hyperlink if a threshold amount of time has passed since the most recent ping was received from the user device. Advantageously, the hybrid redirect/ping-enabled hyperlink may be used to determine whether the user device has transitioned from being ping enabled to being a ping blocker since the most recent ping request was received.

Still referring to FIG. 3, memory 164 is shown to include an interaction recovery module 172. Interaction recovery module 172 may be configured to account for previously unrecorded interactions with distributed content items. For example, interaction recovery module 172 may communicate with ping state module 142 when a ping identifier is received from user devices 108. Interaction recovery module 172 may use the signature attribute of the ping identifier to determine the type of hyperlink included with the associated content item (e.g., traditional redirect, ping-enabled, hybrid redirect/ping-enabled, etc.).

In some implementations, interaction recovery module 172 checks with ping accounting module 168 and/or ping testing module 170 to determine whether a ping request corresponding to the ping identifier was received (e.g., if the associated hyperlink is a ping-enabled or hybrid redirect/ping-enabled hyperlink). If no ping request was received, interaction recovery module 172 may determine whether the interaction was accounted for using the redirect-based accounting technique. For example, interaction recovery module 172 may use the signature included in the ping request to query data storage devices 110 for information whether an interaction with a content item identified by the signature was previously recorded. Alternatively, interaction recovery module 172 may determine that an interaction was previously recorded by communicating with redirect accounting module 166 or based on whether the associated hyperlink included a redirect href through accounting server 112.

In some implementations, interaction recovery module 172 may determine that the interaction resulting in the ping identifier was previously recorded (e.g., using the traditional redirect-based accounting technique), notwithstanding the fact that no ping request was received, if the signature attribute of a received ping identifier corresponds to a content item distributed with a hybrid redirect/ping-enabled hyperlink. However, if the signature attribute of a received ping identifier corresponds to a content item distributed with a ping-enabled hyperlink, interaction recovery module 172 may determine that the interaction was previously unrecorded. Advantageously, interaction recovery module 172 may account for and record an interaction in response to a determination that no interaction corresponding to the ping identifier was previously recorded.

Still referring to FIG. 3, memory 164 is shown to include a profile update module 174. Profile update module 174 may be configured to update the profiles database in response to a determination that a user device is not ping enabled (e.g., a ping blocker). Profile update module 174 may receive information from ping state module 142 regarding received ping identifiers. Profile update module 174 may further receive information from ping accounting module 168 and/or ping testing module 170 regarding ping requests actually received. In some implementations, profile update module 174 compares the signature attributes of received ping identifiers with the signature attributes of received ping requests. Profile update module 174 may determine whether a user device is not ping enabled (e.g., no ping request was received from the user device) or ping enabled (e.g., a ping request was received from the user device) and update the profiles database accordingly.

In some implementations, profile update module 174 may determine whether a user device which is not ping enabled is a confirmed ping or an unconfirmed ping blocker. For example, profile update module 174 may determine that a user device is a confirmed ping blocker if a ping identifier but no ping request was received from the user device. Profile update module 174 may determine that a user device is an unconfirmed ping blocker if no ping request was received, but also no ping identifier was received from the user device. In some implementations, profile update module 174 may compare a time at which the most recent ping request was received from a user device with a current time to determine whether the user device may have transitioned from being ping enabled to being a ping blocker. For example, profile update module 174 may classify a user device as an unconfirmed ping blocker in response to a determination that the difference between the time at which the last ping request was received and the current time exceeds a threshold value. Profile update module 174 may update the profiles database based on a result of the determination.

Figure 4:
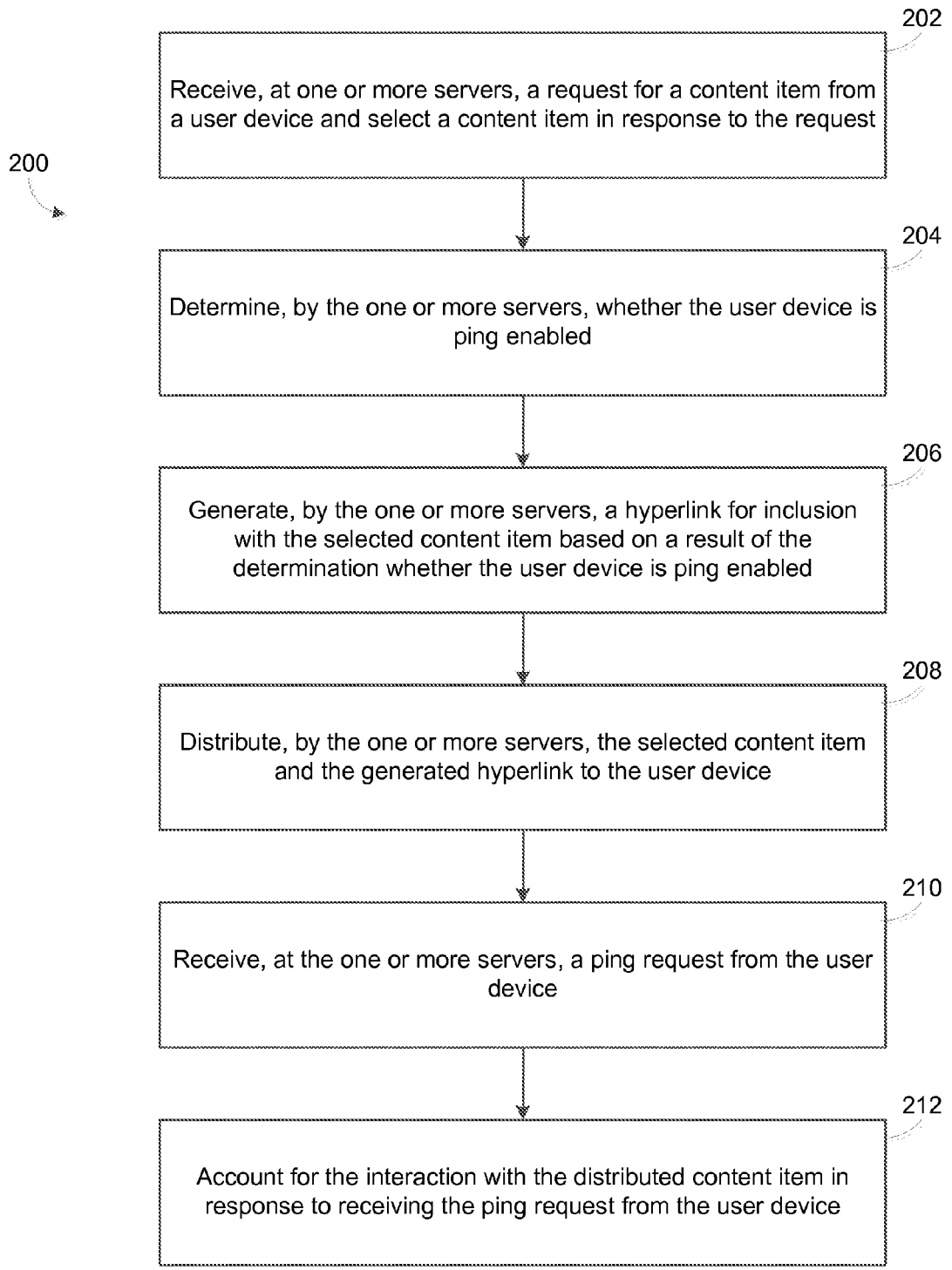
FIG. 4 is a flowchart of a process for accounting for interactions with content items distributed via a computer network, according to a described implementation.

Referring now to FIG. 4, a flowchart of a process 200 for accounting for interactions with content items distributed via a computer network is shown, according to a described implementation. Process 200 may be implemented using computer system 100. The steps of process 200 may be performed by content server 114, accounting server 112, or a single server capable of performing the functions of both content server 114 and accounting server 112 (e.g., a single server which is both the "content server" and the "accounting server"). In some implementations, accounting server 112 and/or content server 114 may be distributed across a plurality of computing devices, with multiple devices performing the steps indicated as being performed by the "content server" and/or the "accounting server."

Process 200 is shown to include receiving, at one or more servers, a request for a content item from a user device (step 202). In some implementations, a request for a content item may be received from a user device (e.g., user devices 108, a web browser running on user devices 108, etc.) in response to the user device viewing resource content (e.g., from resources 104) having one or more embedded content slots. For example, electronic resources may include one or more inline frame elements (e.g., HTML "iframe" elements, <iframe> . . . </iframe>) for presenting third-party content items. An inline frame can be the "target" frame for links defined by other elements and can be selected by user devices as the focus for printing, viewing its source, or other forms of user interaction. The content slots and/or iframe elements may cause a user device to request third-party content items from content server 114 when the resource in which the content slots and/or iframe elements are embedded is viewed by the user device.

Still referring to FIG. 4, step 202 is shown to further include selecting a content item in response to the request. In some implementations, content server 114 may select a content item in response to the content request using content selection module 136. In some implementations, step 202 includes selecting an eligible content item. Eligible content items may include content items having characteristics matching the characteristics of the content slots in which the content items are to be presented. For example, step 202 may involve selecting a content item having a display size which fits in a destination content slot. In some implementations, content selection module 136 may resize a selected content item to fit a content slot or add additional visual content to the selected content item (e.g., padding, a border, etc.) based on the display size of the content item and the display size of the content slot.

In some implementations, step 202 involves selecting a content item determined to be relevant to particular resource 104, user device 108, or search query. In some implementations, step 202 involves selecting a content item by comparing the keywords associated with each content item with information (e.g., profile data, user preferences, etc.) associated with the user device requesting the content item. However, a content item that does not match established user preferences may be selected if an insufficient number of preferred content items are available. In some implementations, step 202 involves selecting a content item based on an established click-through-rate, a predicted click-through-rate, a bid price associated with each content item, or other relevant selection criteria.

Still referring to FIG. 4, process 200 is shown to include determining, by the one or more servers, whether the user device is ping enabled (step 204). User devices may be classified at a particular time as either "ping enabled" user devices or "not ping enabled" user devices. Ping enabled user devices may be defined as user devices which have demonstrated an ability to communicate with accounting server 112 using ping. For example, ping enabled user devices may have previously demonstrated an ability to read a ping attribute within a ping-enabled hyperlink (e.g., an anchor element including both a href attribute and a ping attribute) and send a ping request to accounting server 112 in response to following the ping-enabled hyperlink. Whether a particular user device is ping enabled or ping disabled may be a dynamic characteristic. User devices 108 may transition between being ping enabled and being ping disabled (e.g., ping enabled to ping disabled, ping disabled to ping enabled) over time. In some implementations, content server 114 determines that a user device is ping enabled if a ping request has previously been received from the user device.

User devices 108 which are not ping enabled may be incapable of communicating with accounting server 112 using ping or may have ping functionality blocked or disabled. For example, user devices 108 which are not ping enabled may have not demonstrated an ability to send a ping request to accounting server 112 in response to following a ping-enabled hyperlink. In some implementations, content server 114 determines that a user device is not ping enabled if a ping request has not previously been received from the user device.

In some implementations, step 204 may be performed by accounting technique module 138 and may include referencing or querying a profiles database. The profiles database may be stored on data storage devices 110 or another memory device accessible by content server 114. The profiles database may store a "ping_enabled" attribute for each user device which has had a previous interaction with content server 114 and/or accounting server 112. The ping_enabled attribute may be a binary attribute indicating whether a particular user device is ping enabled (e.g., ping_enabled=true) or not ping enabled (e.g., ping_enabled=false). The profiles database may also store information relating to the most recent pings received from the plurality of user devices. The most recent ping information may then be used to determine whether a user device is ping enabled or ping disabled. Step 204 may include querying the profiles database by submitting a device identifier (e.g., identifying a particular user device) and a request for information regarding whether the user device identified by the device identifier is ping enabled and/or a time of the most recent ping received from the user device.

In some implementations, step 204 includes subdividing user devices which are not ping enabled into two subgroups—confirmed ping blockers and unconfirmed ping blockers. Content server 114 may classify a user device as a confirmed ping blocker in response to a determination that a ping request should have been received from the user device if ping were enabled, when no ping request was actually received. Content server 114 may determine whether a ping request should have been received from a user device using input from ping state module 142, as described with reference to FIG. 2. Content server 114 may determine whether a ping request was actually received using input from the profiles database and/or accounting server 112.

Content server 114 may classify a user device as an unconfirmed ping blocker in response to a determination that a ping request has not been received from the user device when no ping request was expected to have been received. In other words, content server 114 may classify a user device as an unconfirmed ping blocker if the user device has not yet demonstrated an ability to communicate with accounting server 112 using ping, but has not been classified as a confirmed ping blocker. For example, a user device may be classified as an unconfirmed ping blocker if the user device has not been sent a ping-enabled hyperlink and therefore has not yet been provided an opportunity to demonstrate an ability to communicate with accounting server 112 using ping. This situation may arise the first time a content item is requested by a user device.

In some implementations, step 204 involves using input from the profiles database and/or accounting server 112 to determine a time at which a ping request was most recently received from a user device. Content server 114 may classify a user device as an unconfirmed ping blocker if a threshold amount of time has passed since the most recent ping was received from the user device. Advantageously, by classifying a user device as an unconfirmed ping blocker, content server 114 may trigger a "probe and verify" process to determine whether the user device has transitioned from being ping enabled to being a ping blocker. The probe and verify process may be used to accurately classify user devices to ensure that the ping-based accounting technique is reliable for the user devices with which it is used.

Still referring to FIG. 4, process 200 is shown to include generating, by one or more servers, a hyperlink for inclusion with the selected content item (step 206). The hyperlink may include a target URL (e.g., given by a href attribute) and a ping attribute. Advantageously, at least one of the target URL and the ping attribute may be based on a result of the determination (e.g., in step 204) whether the user device is ping enabled (and optionally whether a user device is a confirmed or unconfirmed ping blocker). Step 206 may be performed by hyperlink generation module 140 as described above.

In some implementations, step 206 involves generating a traditional redirect hyperlink. A traditional redirect hyperlink may be generated in response to a determination that a user device is a confirmed ping blocker. A traditional redirect hyperlink may include a href attribute without including a ping attribute. The href attribute of a traditional redirect hyperlink may initially direct a user device to a domain associated with accounting server 112. An example of a traditional redirect hyperlink is provided as follows:

<a href="http://accounting_domain.net?sig=sig&adurl=landing_page.com"> where "accounting_domain.net" is a domain associated with accounting server 112, "sig" is an electronic signature identifying a particular content item, and "landing_page.com" is the URL of the landing page to which user devices should be redirected by accounting server 112 after the interaction is recorded.

In some implementations, step 206 involves generating a ping-enabled hyperlink. A ping enabled hyperlink may be generated in response to a determination that the user device to which the selected content item will be distributed is ping enabled. A ping-enabled hyperlink may include both a href attribute and a ping attribute. An example ping-enabled hyperlink is provided as follows:

<a href="landing_page.com" ping="http://accounting_domain.net?sig=sig"> where "landing_page.com" is the target URL given by the href attribute (e.g., a URL for a target resource), "accounting_domain.net" is the URL of accounting server 112, and "sig" is an electronic signature identifying a particular content item.

Advantageously, a ping enabled hyperlink may direct a user device to the landing page without redirecting through accounting server 112. In some implementations, a ping-enabled hyperlink directs a user device directly to the landing page (e.g., without any redirects). For example, the href attribute included in a ping-enabled hyperlink may specify the URL of the landing page.

In some implementations, step 206 involves generating a ping-enabled hyperlink which leads directly to the landing page. A ping-enabled hyperlink which leads directly to the landing page may be generated when the landing page URL is known or can be predicted/extracted from the original href attribute. For example, the landing page URL may be received from content providers 106 or extracted as the value of the "adurl" attribute of a traditional redirect hyperlink, as shown above.

In other implementations, step 206 involves generating a ping-enabled hyperlink which directs a user device indirectly to the landing page (e.g., through one or more redirects). In some circumstances, it may be difficult to predict the landing page URL. For example, the URL provided by content providers 106 may not be a URL of the landing page, but rather a URL which leads through one or more servers or websites which eventually redirect to the landing page. If included in a traditional redirect hyperlink, the redirect chain for such a URL would begin with accounting server 112, continue through at least one additional redirect server other than accounting server 112, and terminate at the landing page.

In some implementations, step 206 includes shortening the target URL by removing the initial redirect through accounting server 112, thereby shortening the redirect chain, without completely eliminating all redirects (e.g., through servers other than accounting server 112). Advantageously, because the initial redirect through accounting server 112 is removed from the redirect chain, a ping-enabled hyperlink may reduce the latency involved in directing a user device to the landing page.

The ping attribute of a ping-enabled hyperlink may cause a user device to send a ping request to the URL specified by the ping attribute. For example, in the ping-enabled hyperlink shown above, the ping attribute has a value of "http://accounting_domain.net?sig=sig." Therefore, upon following the ping-enabled hyperlink, a user device may send a ping request to the URL "http://accounting_domain.net?sig=sig." Advantageously, the ping request may be executed as a POST request in parallel with navigation to the target URL, thereby optimizing the use of available network bandwidth and reducing the latency involved in reaching the landing page. In some implementations, content server 114 uses a unique identifier of a content item as the signature element (e.g., "sig=unique_ID") of the ping attribute.

In some implementations, step 206 involves generating a hybrid redirect/ping-enabled hyperlink. A hybrid redirect/ping-enabled hyperlink may be generated in response to a determination that the user device to which the selected content item will be distributed is an unconfirmed ping blocker. A hybrid redirect/ping-enabled hyperlink may have a both a href attribute and a ping attribute. An example hybrid redirect/ping-enabled hyperlink is shown as follows:

<a href="http://accounting_domain.net?sig=sig&adurl=landing_page.com"ping="http://accounting_domain.net/ping?sig=sig">

In a hybrid redirect/ping-enabled hyperlink, the href attribute may be the same or similar to the href attribute in the traditional redirect hyperlink as shown above. For example, the href attribute may direct a user device through accounting server 112 for recording an interaction with the distributed content item using a traditional redirect-based accounting technique. However, unlike a traditional redirect hyperlink, a hybrid redirect/ping-enabled hyperlink may also include a ping attribute.

The ping attribute of a hybrid redirect/ping-enabled hyperlink may cause a user device to ping accounting server 112 at the URL specified by the ping attribute when the hyperlink is followed (e.g., upon clicking the associated content item). In some implementations, the ping attribute of a hybrid redirect/ping-enabled hyperlink may be the same or similar as the ping attribute of a ping-enabled hyperlink. In other implementations, the ping attribute of a hybrid redirect/ping-enabled hyperlink may be different than the ping attribute of a ping-enabled hyperlink. For example, the URL included in the ping attribute of the hybrid redirect/ping-enabled hyperlink shown above includes the additional term "/ping." This additional term may cause the ping request to be sent to a specific component of accounting server 112 (e.g., a specific webpage or resource located at "http://accounting_domain.net/ping").

In some implementations, ping requests sent to this component of accounting server 112 may be used for ping testing purposes only (e.g., to determine whether a user device is capable of communicating with accounting server 112 using ping). Ping requests sent to the "/ping" component of accounting server 112 may not recorded as independent interactions with the distributed content item because such interactions may have already been recorded using the traditional redirect-based accounting technique (e.g., by redirecting through accounting server 112 with the target URL).

In some implementations, step 206 involves using input from the profiles database and/or accounting server 112 to determine a time at which a ping request was most recently received from a user device. Content server 114 may generate a hybrid redirect/ping-enabled hyperlink to determine whether the user device has transitioned from being ping enabled to being a ping blocker if the difference between the most recent ping request received from the user device and the current time exceeds a threshold value.

Still referring to FIG. 4, process 200 is shown to include distributing, by the one or more servers, the selected content item and the generated hyperlink to the user device (step 208). The generated hyperlink may be integrated with content item or embedded into the content item. For example, the hyperlink may be applied to the content item as an anchor element or area element. Step 208 may include transmitting the content item with the integrated hyperlink to user devices 108 via network 102. The content item may be presented to a user device in a third-party content slot (e.g., an HTML iframe) of resources 104 along with first-party resource content.

Still referring to FIG. 4, process 200 is shown to include receiving, at the one or more servers, a ping request from the user device (step 210). In some implementations, a ping request may be received from a ping enabled user device in response to the user device interacting with the distributed content item. An interaction with a content item may include displaying the content item, hovering over the content item, clicking on the content item, viewing source information for the content item, or any other type of interaction between user devices 108 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item), by content providers 106, or by content server 114.

In some implementations, the ping request may be received from ping enabled user devices when ping enabled user devices follow a hyperlink having a ping attribute (e.g., a ping-enabled hyperlink, a hybrid redirect/ping-enabled hyperlink, etc.). The ping request may be executed as a POST request in compliance with HTML5 standards. For example, the ping request may include the target URL (e.g., included as a "Ping-To" header) and optionally a URL of the resource or content item containing the hyperlink (e.g., included as an optional "Ping-From" or "Referer" attribute). In some implementations, the ping request is received at the accounting server only if the user device is ping enabled. If the user device is not ping enabled, the ping request may not be received. In some implementations, step 210 is optional and may be performed only if the user device is ping enabled.

Still referring to FIG. 4, process 200 is shown to include accounting for the interaction with the distributed content item in response to receiving the ping request from the user device (step 212). Step 212 may be performed by ping accounting module 168 and/or ping testing module 170 of accounting server 112. In step 212, accounting server 112 may account for interactions with distributed content items using a ping-based accounting technique. In some implementations, accounting server 112 identifies a particular user device from which the ping request was received. Accounting server 112 may use the signature element of the ping attribute (e.g., "sig=unique_ID") to identify and account for an interaction with a particular content item. Advantageously, the ping-based accounting technique may reduce the latency involved in reaching the landing page.

Figure 5:
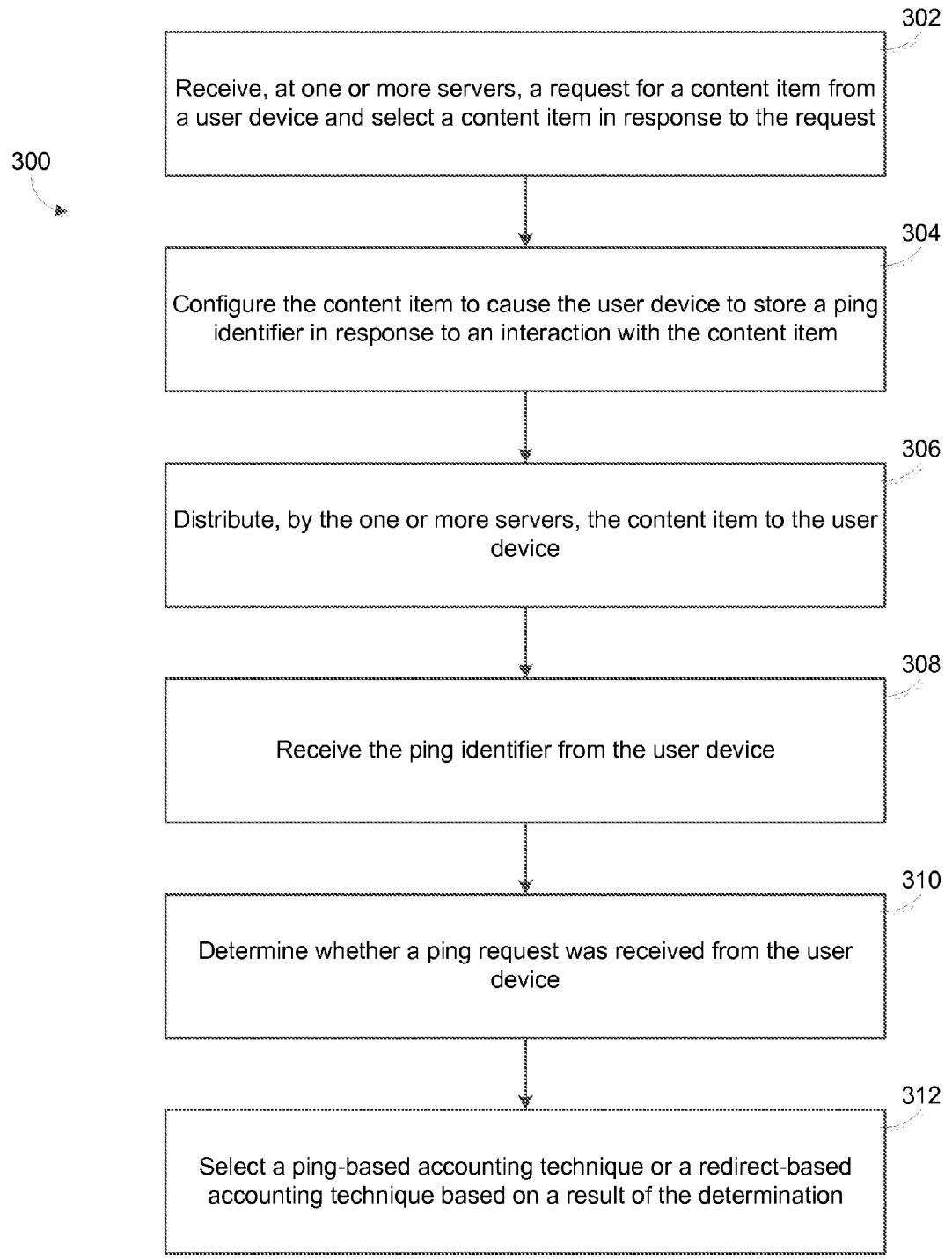
FIG. 5 is a flowchart of a process for selecting an accounting technique for recording interactions with distributed content items, according to a described implementation.

Referring now to FIG. 5, a flowchart of a process 300 for selecting an accounting technique for recording interactions with distributed content items is shown, according to a described implementation. Process 300 may be implemented using computer system 100. The steps of process 300 may be performed by content server 114, accounting server 112, or a single server capable of performing the functions of both content server 114 and accounting server 112 (e.g., a single server which is both the "content server" and the "accounting server"). In some implementations, accounting server 112 and/or content server 114 may be distributed across a plurality of computing devices, with multiple devices performing the steps indicated as being performed by the "content server" and/or the "accounting server."

Process 300 is shown to include receiving, at one or more servers, a request for a content item from a user device (step 302). In some implementations, a request for a content item may be received from a user device (e.g., user devices 108, a web browser running on user devices 108, etc.) in response to the user device viewing resource content (e.g., from resources 104) having one or more embedded content slots. For example, electronic resources may include one or more inline frame elements (e.g., HTML "iframe" elements, <iframe> . . . </iframe>) for presenting third-party content items. An inline frame can be the "target" frame for links defined by other elements and can be selected by user devices as the focus for printing, viewing its source, or other forms of user interaction. The content slots and/or iframe elements may cause a user device to request third-party content items from content server 114 when the resource in which the content slots and/or iframe elements are embedded is viewed by the user device.

Still referring to FIG. 5, step 302 is shown to further include selecting a content item in response to the request. In some implementations, content server 114 may select a content item in response to the content request using content selection module 136. In some implementations, step 202 includes selecting an eligible content item. Eligible content items may include content items having characteristics matching the characteristics of the content slots in which the content items are to be presented. For example, step 302 may involve selecting a content item having a display size which fits in a destination content slot. In some implementations, content selection module 136 may resize a selected content item to fit a content slot or add additional visual content to the selected content item (e.g., padding, a border, etc.) based on the display size of the content item and the display size of the content slot.

In some implementations, step 302 involves selecting a content item determined to be relevant to particular resource 104, user device 108, or search query. In some implementations, step 302 involves selecting a content item by comparing the keywords associated with each content item with information (e.g., profile data, user preferences, etc.) associated with the user device requesting the content item. However, a content item that does not match established user preferences may be selected if an insufficient number of preferred content items are available. In some implementations, step 302 involves selecting a content item based on an established click-through-rate, a predicted click-through-rate, a bid price associated with each content item, or other relevant selection criteria.

Still referring to FIG. 5, process 300 is shown to include configuring the content item to cause the user device to store a ping identifier (step 304). The ping identifier may be stored by a user device in response to an interaction with the selected content item. In some implementations, step 304 may be performed by ping state module 142 of content server 114. Ping state module 142 may be configured to modify a content item to include embedded instructions. Embedded instructions may include computer-readable instructions (e.g., software code, JavaScript®, ECMAScript®, etc.) which cause user devices 108 to perform actions instructed by the embedded instructions upon interacting with the associated content item.

In some implementations, step 304 includes integrating a Javascript® on-click handler with the content item. The on-click handler may cause user devices to store the ping identifier in response to a detected interaction with a content item. The ping identifier may be a cookie (e.g., an HTTP cookie, a browser cookie, a web cookie, etc.) or other indication that a user device interacted with a particular content item. For example, the ping identifier may be a "_icanping_=sig" cookie, where the element "sig" is a signature identifying a particular content item. The signature included in the ping identifier may match the signature included in the ping attribute of the associated content item. The ping identifier may be stored by the user device in a local memory thereof. In some implementations, the ping identifier may be stored as a cookie for a domain associated with content server 114 (e.g., the source of the distributed content item).

In some implementations, the ping identifier may be stored only in response to an interaction with the content item. Therefore, the presence of a ping identifier may be evidence of an interaction with the associated content item. In other words, if a ping identifier is stored on the user device, it may be determined that the user device interacted with the associated content item.

Still referring to FIG. 5, process 300 is shown to include distributing, by the one or more servers, the content item to the user device (step 306). In some implementations, step 306 includes transmitting the content item to user devices 108 via network 102. The content item may be presented to a user device in a third-party content slot (e.g., an HTML iframe) of resources 104 along with first-party resource content.

In some implementations, the distributed content item includes a hyperlink having a ping attribute. In other words, the distributed content item may include a ping-enabled hyperlink or a hybrid ping-enabled/redirect hyperlink as described above. The hyperlink may be integrated with content item or embedded into the content item. For example, the hyperlink may be applied to the content item as an anchor element or area element. The ping attribute may cause the user device to send a ping request to an accounting server (e.g., accounting server 112) in response to the interaction with the content item (e.g., following the hyperlink) if the user device is ping enabled.

Still referring to FIG. 5, process 300 is shown to include receiving the ping identifier from the user device (step 308). In some implementations, the ping identifier may be stored as a cookie for a domain associated with content server 114. Accordingly, the ping identifier may be sent from user devices 108 to content server 114 as part of a future interaction between user devices 108 and content server 114. For example, a user device may communicate a stored ping identifier to content server 114 as part of a subsequent request for a content item. The ping identifier may be evidence that the user device interacted with a particular content item. In some implementations, step 308 includes identifying the particular content item associated with the ping identifier (e.g., based on a signature attribute of the ping identifier, etc.).

Still referring to FIG. 5, process 300 is shown to include determining whether a ping request was received from the user device (step 310). The ping request may have been received from the user device if the user device is ping enabled. In some implementations, a ping request may be received from a ping enabled user device in response to the user device interacting with the distributed content item. The ping request may be received at accounting server 112, via ping accounting module 168 and/or ping testing module 170.

Step 310 may include referencing or querying a profiles database. The profiles database may be stored on data storage devices 110 or another memory device accessible by content server 114. The profiles database may store the ping requests received from user devices 108. By referencing or querying the profiles database, content server 114 may determine whether a ping request was previously received from the user device. In some implementations, content server 114 may interact directly with accounting server 112 to determine whether the ping request was received.

In some implementations, step 310 includes comparing a signature element of the ping identifier with a signature attribute of received ping requests. A distributed content item may be configured (e.g., in step 304) to cause a user device to store a ping identifier and send a ping request having a matching signature attribute. By comparing the signature attributes of received ping requests with the signature attribute of the received ping identifier, content server 114 may determine whether a ping request corresponding to a particular ping identifier was received.

Still referring to FIG. 5, process 300 is shown to include selecting a ping-based accounting technique or a redirect-based accounting technique based on a result of the determination (step 312). In some implementations, step 312 involves selecting the ping-based accounting technique in response to a determination (in step 310) that the ping request was received from the user device. If the ping request (e.g., a ping request matching or corresponding to the ping identifier)

was received from the user device, it may be determined that the user device is ping enabled. Therefore, the user device may be capable of communicating with accounting server 112 using ping and the ping-based accounting technique can be used with respect to future content items distributed to the user device.

Step 312 may involve selecting the redirect-based accounting technique in response to a determination (in step 310) that the ping request was not received from the user device. If the ping request was not received from the user device, it may be determined that the user device is not communicating with accounting server 112 using ping. The received ping identifier may indicate that a ping request should have been received from the user device if the user device were ping enabled. If a ping identifier but no ping request was received, it may be determined that the user device is a ping blocker or otherwise not ping enabled. Therefore, the redirect-based accounting technique may be used with respect to future content items distributed to the user device.

In any implementation, the term "ping" may be defined as any potentially not-entirely-reliable browser-based method of asynchronous event reporting. References to the term "ping" throughout this description may include various event reporting mechanisms other than the HTML ping attribute as previously described. The systems and methods described herein may be equally applicable to other event reporting mechanisms in addition to or in place of ping. A potentially not-entirely-reliable browser-based method of asynchronous event reporting may include inherently not-entirely-reliable methods (e.g., such as ping) as well as entirely reliable methods which are not trusted for any particular reason or combination of reasons.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for reliably using ping to account for interactions with electronic content, the method comprising:
   receiving, at one or more servers, a request for a content item from a user device and selecting a content item in response to the request;
   determining, by the one or more servers, whether the user device is ping enabled;
   generating, by the one or more servers, a hyperlink for inclusion with the selected content item, the hyperlink having a target URL and a ping attribute, wherein at least one of the target URL and the ping attribute is based on a result of the determination whether the user device is ping enabled;
   distributing, by the one or more servers, the selected content item and the generated hyperlink to the user device;
   receiving, at the one or more servers, a ping request from the user device, wherein the ping request is received at the one or more servers in response to an interaction with the distributed content item if the user device is ping enabled, wherein the ping request includes the target URL and an identifier of the distributed content item; and
   accounting for the interaction with the distributed content item in response to receiving the ping request from the user device.

2. The method of claim 1, further comprising:
   causing the user device to store a ping identifier in a local memory of the user device in response to the detected interaction with the distributed content item, wherein the ping identifier is associated with the ping request received from the user device if the user device is ping enabled;
   receiving, at the one or more servers, a second request for a content item from the user device, wherein the second request includes the stored ping identifier;
   determining whether the ping request associated with the ping identifier was previously received from the user device; and
   identifying the user device as ping enabled in response to a determination that the associated ping request was previously received.

3. The method of claim 1, further comprising:
   receiving, at the one or more servers, a redirect request from the user device; and
   determining whether to account for the interaction using the ping request or the redirect request.

4. The method of claim 1, further comprising:
   storing, in a profiles database, an indication that the ping request was received from the user device in response to receiving the ping request,
   wherein determining whether the user device is ping enabled includes retrieving information from the profiles database.

5. The method of claim 1, wherein the target URL is based on a result of the determination whether the user device is ping enabled,
   wherein if the user device is determined to be non-ping enabled, the target URL directs the user device to a resource associated with the one or more servers for recording the interaction with the distributed content item using a redirect-based accounting technique.

6. The method of claim 1, wherein the target URL is based on a result of the determination whether the user device is ping enabled,
   wherein if the user device is determined to be ping enabled, the target URL directs the user device to a landing page associated with the distributed content item without directing the user device to a resource associated with the one or more servers.

7. The method of claim 1, wherein the target URL is based on a result of the determination whether the user device is ping enabled,
   wherein if the user device is determined to be not ping enabled, the target URL includes both a URL associated with the accounting server and a URL associated with a landing page for the distributed content item.

8. The method of claim 1, wherein the ping attribute is based on a result of the determination whether the user device is ping enabled,
   wherein if the user device is determined to be ping enabled, the ping attribute includes a URL associated with the one or more servers for recording the interaction with the distributed content item using a ping-based accounting technique.

9. The method of claim 1, further comprising:
   removing the ping attribute from the hyperlink in response to a determination that the user device is not ping enabled.

10. A system for reliably using ping to account for interactions with electronic content, the system comprising:
    one or more servers configured to
       receive a request for a content item from a user device and select a content item in response to the request;
       determine whether the user device is ping enabled;
       generate a hyperlink for inclusion with the selected content item, the hyperlink having a target URL and a ping attribute, wherein at least one of the target URL and the ping attribute is based on a result of the determination whether the user device is ping enabled;

distribute the selected content item and the generated hyperlink to the user device;

receive a ping request from the user device, wherein the ping request is received in response to an interaction with the distributed content item if the user device is ping enabled, wherein the ping request includes the target URL and an identifier of the distributed content item; and account for the interaction with the distributed content item in response to receiving the ping request from the user device.

11. The system of claim 10, wherein the one or more servers are further configured to:

cause the user device to store a ping identifier in a local memory of the user device in response to the detected interaction with the distributed content item, wherein the ping identifier is associated with the ping request received from the user device if the user device is ping enabled;

receive a second request for a content item from the user device, wherein the second request includes the stored ping identifier;

determine whether the ping request associated with the ping identifier was previously received from the user device; and identify the user device as ping enabled in response to a determination that the associated ping request was previously received.

12. The system of claim 10, wherein the one or more servers are further configured to:

receive a redirect request from the user device; and determine whether to account for the interaction using the ping request or the redirect request.

13. The system of claim 10, wherein the one or more servers are further configured to:

store, in a profiles database, an indication that the ping request was received from the user device in response to receiving the ping request, wherein determining whether the user device is ping enabled includes retrieving information from the profiles database.

14. The system of claim 10, wherein the target URL is based on a result of the determination whether the user device is ping enabled, wherein if the user device is determined to be non-ping enabled, the target URL directs the user device to a resource associated with the one or more servers for recording the interaction with the distributed content item using a redirect-based accounting technique, wherein if the user device is determined to be ping enabled, the target URL directs the user device to a landing page associated with the distributed content item without directing the user device to a resource associated with the one or more servers.

15. The system of claim 10, wherein the target URL is based on a result of the determination whether the user device is ping enabled, wherein if the user device is determined to be not-ping enabled, the target URL includes both a URL associated with the accounting server and a URL associated with a landing page for the distributed content item.

16. The system of claim 10, wherein the ping attribute is based on a result of the determination whether the user device is ping enabled, wherein if the user device is determined to be ping enabled, the ping attribute includes a URL associated with the one or more servers for recording the interaction with the distributed content item using a ping-based accounting technique.

17. The system of claim 10, wherein the one or more servers are further configured to:

remove the ping attribute from the hyperlink in response to a determination that the user device is not ping enabled.

18. One or more computer-readable storage media having instructions stored therein, the instructions being executable by one or more processors to cause the one or more processors to perform operations comprising:

receiving a request for a content item from a user device and selecting a content item in response to the request;

determining whether the user device is ping enabled;

generating a hyperlink for inclusion with the selected content item, the hyperlink having a target URL and a ping attribute, wherein at least one of the target URL and the ping attribute is based on a result of the determination whether the user device is ping enabled;

distributing the selected content item and the generated hyperlink to the user device;

receiving a ping request from the user device, wherein the ping request is received at one or more servers in response to an interaction with the distributed content item if the user device is ping enabled, wherein the ping request includes the target URL and an identifier of the distributed content item; and accounting for the interaction with the distributed content item in response to receiving the ping request from the user device.

19. The computer-readable storage media of claim 18, wherein the instructions are executable by the one or more processors to cause the one or more processors to perform operations further comprising:

causing the user device to store a ping identifier in a local memory of the user device in response to the detected interaction with the distributed content item, wherein the ping identifier is associated with the ping request received from the user device if the user device is ping enabled;

receiving a second request for a content item from the user device, wherein the second request includes the stored ping identifier;

determining whether the ping request associated with the ping identifier was previously received from the user device; and identifying the user device as ping enabled in response to a determination that the associated ping request was previously received.

20. The computer-readable storage media of claim 18, wherein the instructions are executable by the one or more processors to cause the one or more processors to perform operations further comprising:

receiving a redirect request from the user device; and determining whether to account for the interaction using the ping request or the redirect request.

* * * * *